(12) United States Patent
Sugita

(10) Patent No.: US 8,681,431 B2
(45) Date of Patent: Mar. 25, 2014

(54) ZOOM LENS AND OPTICAL APPARATUS

(75) Inventor: Shigenobu Sugita, Shimotsuke (JP)

(73) Assignee: Canon Kabushiki Kaisha (JP)

( * ) Notice: Subject to any disclaimer, the term of this patent is extended or adjusted under 35 U.S.C. 154(b) by 99 days.

(21) Appl. No.: 13/074,622

(22) Filed: Mar. 29, 2011

(65) Prior Publication Data
US 2011/0242675 A1  Oct. 6, 2011

(30) Foreign Application Priority Data

Mar. 31, 2010 (JP) ................................. 2010-081072

(51) Int. Cl.
*G02B 15/14* (2006.01)

(52) U.S. Cl.
USPC .......................................... 359/676; 359/683

(58) Field of Classification Search
USPC .................. 359/687–688, 690, 692
See application file for complete search history.

(56) References Cited

U.S. PATENT DOCUMENTS

| | | | |
|---|---|---|---|
| 2,844,996 A | 7/1958 | Klemt | |
| 4,494,828 A * | 1/1985 | Masumoto et al. | 359/690 |
| 4,623,226 A | 11/1986 | Fujii | |
| 4,653,874 A * | 3/1987 | Takahashi et al. | 359/690 |
| 6,266,189 B1 | 7/2001 | Konno et al. | |
| 6,483,649 B2 * | 11/2002 | Ozaki | 359/690 |
| 6,781,767 B2 | 8/2004 | Hashimura et al. | |
| 7,471,462 B2 * | 12/2008 | Hatada | 359/690 |
| 7,554,746 B2 | 6/2009 | Ohashi | |

FOREIGN PATENT DOCUMENTS

| | | | |
|---|---|---|---|
| JP | 60-175020 A | 9/1985 | |
| JP | 61-133916 A | 6/1986 | |
| JP | 63-318513 A | 12/1988 | |
| JP | 64-078210 A | 3/1989 | |
| JP | 02-167520 A | 6/1990 | |
| JP | 10-333035 A | 12/1998 | |
| JP | 11202202 A | 7/1999 | |
| JP | 2005315914 A | 11/2005 | |
| JP | 2005-352265 A | 12/2005 | |
| JP | 2006171628 A | 6/2006 | |
| JP | 2007-003600 A | 1/2007 | |
| JP | 2008304857 A | 12/2008 | |

OTHER PUBLICATIONS

Extended European Search Report issued in European counterpart application No. EP111603452, issued Aug. 9, 2012.
Warren J. Smith: "Modern Lens Design", Jan. 1, 1992, Mc Grow-Hill, NY XP002664623, ISBN: 0-07-059178-4, p. 72-75.
Partial European Search Report issued in counterpart application No. 11160345.2, dated Dec. 16, 2011.
Japanese Office Action issued in corresponding Japanese patent application No. JP2010-081072, dated May 21, 2013.
Office Action issued in counterpart Japanese Patent Application No. 2013-087254 dated Dec. 24, 2013.

* cited by examiner

*Primary Examiner* — Jordan Schwartz
(74) *Attorney, Agent, or Firm* — Rossi, Kimms & McDowell LLP

(57) ABSTRACT

The zoom lens includes a first lens unit being disposed closest to an object and having a positive optical power, and at least one subsequent lens unit being disposed closer to an image than the first lens unit. The first lens unit is moved toward the object during variation of magnification from a wide-angle end to a telephoto end. The first lens unit is constituted by at least three lenses including a positive meniscus lens being disposed closest to the image among the at least three lenses and having an image side concave surface, and a negative lens being disposed on an object side next to the positive meniscus lens. A condition of $1.55<Rpi/f1<2.90$ is satisfied where Rpi represent a curvature radius of the image side concave surface of the positive meniscus lens, and f1 represents a focal length of the first lens unit.

6 Claims, 11 Drawing Sheets

ZOOM LENS AND OPTICAL APPARATUS

BACKGROUND OF THE INVENTION

1. Field of the Invention

The present invention relates to a zoom lens used for optical apparatuses such as digital still cameras, video cameras and interchangeable lenses.

2. Description of the Related Art

High variable magnification zoom lenses whose focal lengths are largely variable are disclosed in Japanese Patent Laid-Open Nos. 2007-003600 and 04-186211. These zoom lenses constituted by at least five lens units including, in order from an object side, a first lens unit having a positive optical power and a second lens unit having a negative optical power. In these zoom lenses, in order to effectively provide a high variable magnification ratio, the first lens unit is largely moved toward an object in an optical axis direction during variation of magnification from a wide-angle end to a telephoto end.

In such zoom lenses, in order to move the first lens unit smoothly, it is necessary to provide a play (hereinafter referred to as an "engagement play") to an engagement part between a first lens barrel that holds the first lens unit and a supporting lens barrel that supports the first lens barrel movably in the optical axis direction. Therefore, the first lens barrel (first lens unit) is decentered with respect to the supporting lens barrel (second lens unit and other lens units subsequent thereto) in a state where the first lens barrel is moved largely toward the object.

The decentering of the first lens unit at which an axial ray height and an off-axis principal ray height are both large significantly affects optical performance of the zoom lens, in other words, easily causes optical performance deterioration.

The zoom lens disclosed in Japanese Patent Laid-Open No. 2007-003600 is constituted by six lens units including, in order form the object side, positive, negative, positive, negative, positive and negative lens units. The most-object side (positive) lens unit as a first lens unit is largely moved to the object side to perform variation of magnification. In such a zoom lens, since a focusing mechanism can be configured simply, focusing is often performed by moving the first lens unit. Therefore, it is necessary to form a movement mechanism of the first lens unit so as to have a dual structure including a dual engagement play, which causes larger decentering of the first lens unit.

Moreover, the zoom lens disclosed in Japanese Patent Laid-Open No. 04-186211 is constituted by six lens units including, in order form the object side, positive, negative, positive, negative, positive and negative lens units. The most-object side (positive) lens unit as a first lens unit is moved to perform variation of magnification, and the most-image side (negative) lens unit as a sixth lens unit is moved to perform focusing. Therefore, this zoom lens can reduce the engagement play of the first lens unit as compared with the zoom lens disclosed in Japanese Patent Laid-Open No. 2007-003600. However, there is no difference in that an optical performance deterioration sensitivity (ease of deterioration of the optical performance) for the decentering of the first lens unit is high.

SUMMARY OF THE INVENTION

The present invention provides a zoom lens with a low optical performance deterioration sensitivity for the decentering of the first lens unit that is moved largely during the variation of magnification.

The present invention provides as one aspect thereof a zoom lens including a first lens unit being disposed closest to an object and having a positive optical power, and at least one subsequent lens unit being disposed closer to an image than the first lens unit. The first lens unit is moved toward the object during variation of magnification from a wide-angle end to a telephoto end. The first lens unit is constituted by at least three lenses including a positive meniscus lens being disposed closest to the image among the at least three lenses and having an image side concave surface, and a negative lens being disposed on an object side next to the positive meniscus lens, and satisfies the following condition:

$$1.55 < Rpi/f1 < 2.90$$

where Rpi represent a curvature radius of the image side concave surface of the positive meniscus lens, and f1 represents a focal length of the first lens unit.

The present invention provides as another aspect thereof a zoom lens including a first lens unit being disposed closest to an object and having a positive optical power, and at least one subsequent lens unit being disposed closer to an image than the first lens unit. The first lens unit is moved toward the object during variation of magnification from a wide-angle end to a telephoto end. The first lens unit is constituted by at least three lenses including a negative lens being disposed closest to the image among the at least three lenses and having an image side concave surface, and a positive lens being disposed on an object side next to the negative lens and having an object side convex surface, and satisfies the following condition:

$$0.30 < Rpo/f1 < 3.00$$

where Rpo represents a curvature radius of the object side convex surface of the positive lens, and f1 represents a focal length of the first lens unit.

The present invention provides as still another aspect thereof an optical apparatus including the above-described zoom lens.

Further features of the present invention will become apparent from the following description of exemplary embodiments (with reference to the attached drawings).

DESCRIPTION OF THE PREFERRED EMBODIMENTS

Figure 1:
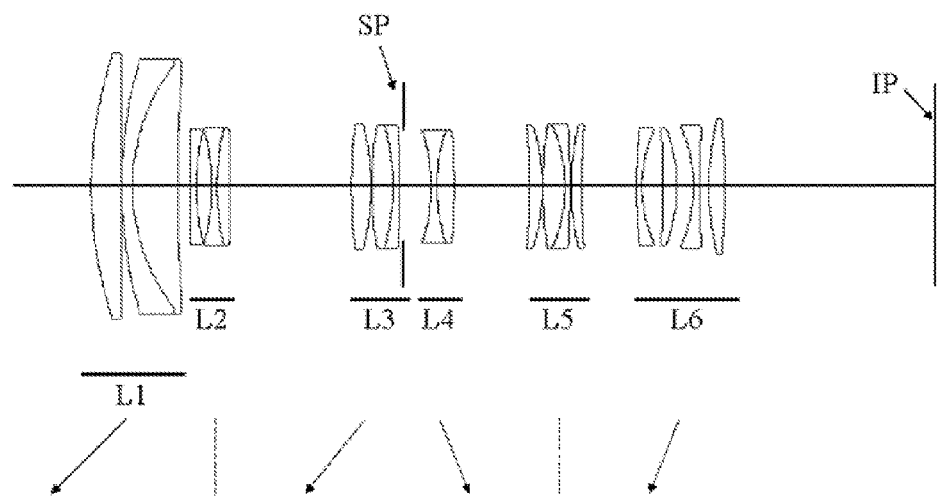
FIG. 1 is a cross-sectional view showing a configuration of a zoom lens that is Embodiment 1 of the present invention.
Figure 2A:
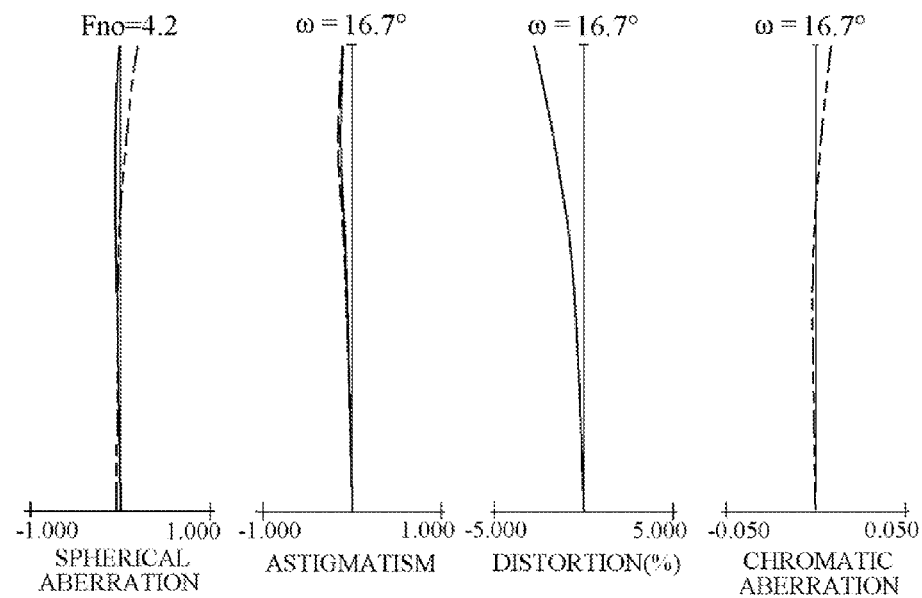
FIG. 2A shows aberrations of a zoom lens of Numerical Example 1 of the present invention at a wide-angle end zoom position and an infinite end focus position.
Figure 2B:
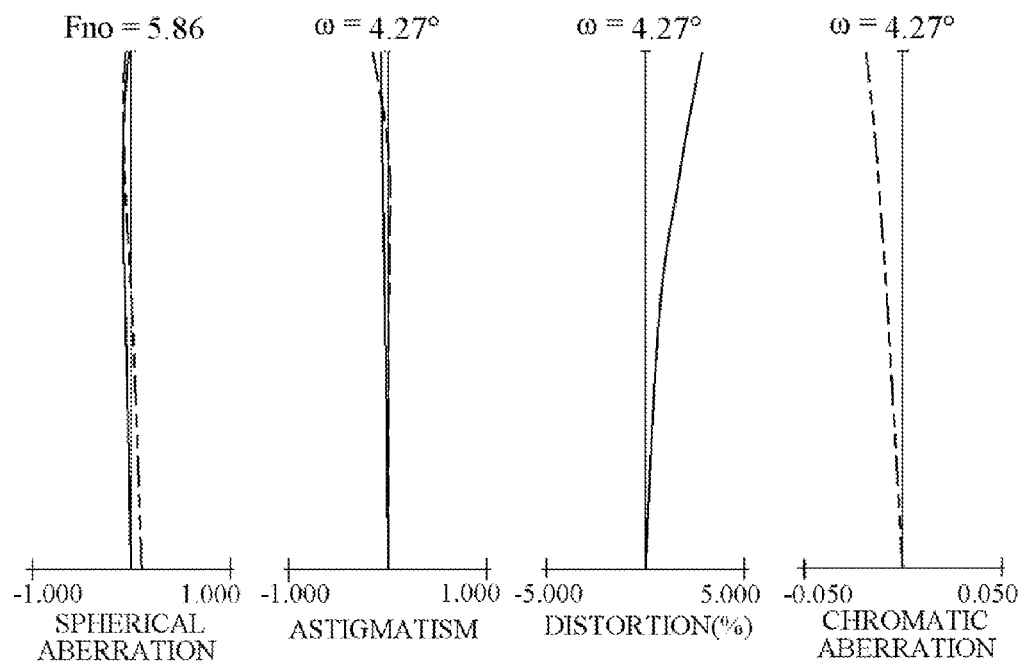
FIG. 2B shows aberrations of the zoom lens of Numerical Example 1 at a telephoto end zoom position and the infinite end focus position.
Figure 3:
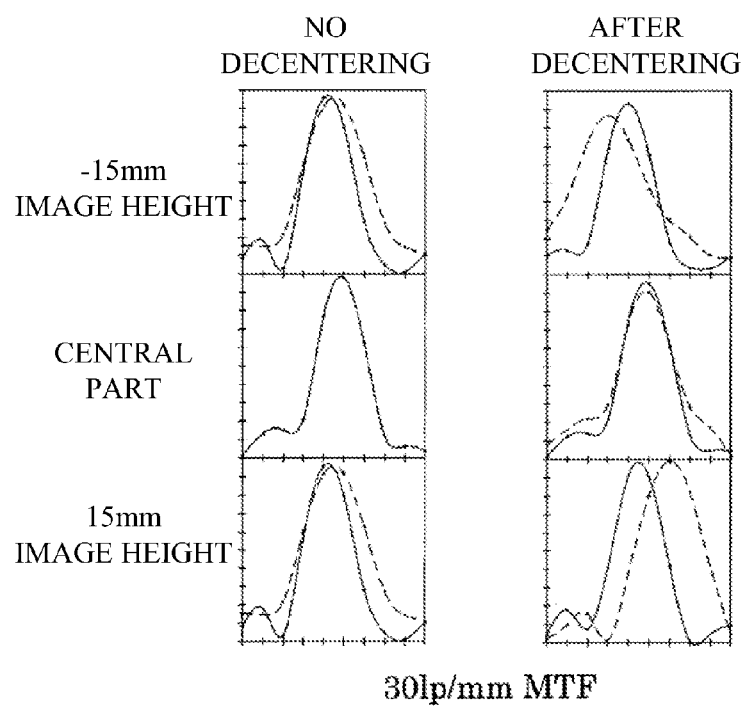
FIG. 3 shows variation of MTF when decentering of a first lens unit in the zoom lens of Numerical Example 1 is generated at the telephoto end.

Exemplary embodiments of the present invention will hereinafter be described with reference to the accompanying drawings.

Each of zoom lenses of the following embodiments includes a first lens unit being disposed closest to an object and having a positive optical power, and at least one subsequent lens unit being disposed closer to an image than the first lens unit. The optical power is an inverse of a focal length. The first lens unit is moved toward the object during variation of magnification (hereinafter also referred to as "zooming") from a wide-angle end to a telephoto end. Each embodiment suppresses optical performance deterioration, that is, lowers an optical performance deterioration sensitivity for decentering of the first lens unit on the basis of the following principle.

The "lens unit" means a unit of one lens or plural lenses which is integrally moved in an optical axis direction during the zooming. Therefore, a distance between different lens units is changed during the zooming.

At the first lens unit disposed closest to the object, it is obvious that an off-axis principal ray height h– is large. Moreover, an axial ray height h thereat is also large because h≈ft/2Ft is established where ft represents a focal length of the zoom lens of each embodiment having a long focal length at a telephoto end and Ft represents an F-number at the telephoto end.

A third-order aberration theory expresses spherical aberration by a fourth power of h, comatic aberration by a third power of h and a first power of h–, and field curvature by a second power of h and a second power of h–. Furthermore, as also described in "Lens Design Method" (Yoshiya Matsui, Kyoritsu Shuppan Co., Ltd.), at a telephoto end of a zoom lens whose h and h– are both large, decentering of the first lens unit easily causes optical performance deterioration.

As with the above-described zoom lens disclosed in Japanese Patent Laid-Open No. 04-186211, moving a most-image side lens unit (last lens unit) for focusing enables simplification of a drive mechanism for the first lens unit, and thereby an engagement play therein is relatively reduced. However, measures to lower the optical performance deterioration sensitivity for the decentering of the first lens unit are not taken, so that the optical performance deterioration due to the engagement play cannot be suppressed.

Thus, each embodiment of the present invention focuses on incident angles of rays on respective surfaces in the first lens unit to lower the optical performance deterioration sensitivity for the decentering of the first lens unit.

A parallel (collimated) light flux entering the first lens unit from an object side becomes a light flux converging toward a position away from the first lens unit by a focal length f1 thereof on an image side further than the first lens unit.

In a case where the first lens unit includes a biconvex lens as a most-image side lens as with the zoom lens disclosed in Japanese Patent Laid-Open No. 2007-003600, angles of normals to an image side convex surface of the biconvex lens formed with an optical axis are diffusion direction angles. Therefore, the inventor found that large angular differences between incident rays and the normals to the image side convex surface makes a refractive power of the image side convex surface strong. Moreover, the inventor also found that the decentering of the first lens unit due to the engagement play and manufacturing errors of the zoom lens causes a large aberration variation at the image side convex surface.

Thus, each embodiment of the present invention places, at a position closest to the image in the first lens unit, a positive meniscus lens having an image side surface concave toward the image (that is, having an image side concave surface). This configuration causes the axial ray and the off-axis principal ray to enter the positive meniscus lens in directions of the normals to the image side concave surface, which makes it possible to reduce the refractive power of the image side concave surface, thereby enabling reduction of the aberration variation due to the decentering of the first lens unit.

In addition, each embodiment of the present invention sets a ratio (Rpi/f1) of a curvature radius Rpi of the above-described image side concave surface of the positive meniscus lens to the focal length f1 of the first lens unit, ratio which decides ray angles on the image side further than the first lens unit, within a certain range. This makes it possible to more effectively reduce the aberration variation due to the decentering of the first lens unit.

Moreover, the image side concave surface of the positive meniscus lens makes it necessary to provide a large curvature (that is, a small curvature radius) to an object side convex surface of the positive meniscus lens so as to provide a desired positive optical power thereto. However, an excessively large curvature of the object side convex surface causes angles of normals to this object side convex surface to differ from incident angles of rays thereon, which increases the optical performance deterioration sensitivity for the decentering of the first lens unit.

Thus, each embodiment of the present invention cements the object side convex surface of the positive meniscus lens to a negative meniscus lens disposed on the object side next to the positive meniscus lens. This makes it possible to reduce the optical power provided to the positive meniscus lens, thereby lowering the optical performance deterioration sensitivity for the decentering of the first lens unit.

However, it is not necessarily needed to cement the positive meniscus lens to the negative meniscus lens, and an air lens having an extremely small optical power may be formed between surfaces of these meniscus lenses facing each other and having similar curvatures to each other. Such a configuration cancels out decentering aberrations generated at the surfaces facing each other, which suppresses the optical performance deterioration of the zoom lens.

Furthermore, each embodiment of the present invention focuses on an object side convex surface of the negative meniscus lens included in the first lens unit. A large curvature of an image side concave surface of the negative meniscus lens makes it necessary to avoid an excessive power of the entire negative meniscus lens, and easily increases the curvature of the object side convex surface of the negative meniscus lens.

A negative lens included in a lens unit having a positive optical power is normally formed of a high dispersion material so as to effectively correct chromatic aberration. If the object side convex surface of the negative meniscus lens included in the first lens unit has a large curvature, the object side convex surface at which the off-axis principal ray height h− is large has a convergent refractive power for off-axis rays. This makes correction of a first-order chromatic aberration of magnification inefficient, which increases the optical performance deterioration.

Thus, each embodiment of the present invention decreases a refractive index of the negative meniscus lens to a limit where a Petzval sum of the first lens unit does not become excessive in order to reduce the curvature of the object side convex surface of the negative meniscus lens, which causes the off-axis rays to enter the object side convex surface in directions of the normals thereto.

In each embodiment, the first lens unit is constituted by three lenses including the above-described positive meniscus lens and the negative lens. However, the first lens unit may be constituted by at least three lenses such as four lenses.

Japanese Patent Laid-Open Nos. 08-086962, 2000-028924 and 2005-215389 also disclose zoom lenses having a first lens unit including a positive lens disposed closest to an image and a negative lens disposed on an object side next to the positive lens.

However, in the zoom lenses disclosed in Japanese Patent Laid-Open Nos. 08-086962 and 2000-028924, an image side surface of the positive lens disposed closest to the image in the first lens unit is formed as a planar surface or a concave surface having a small curvature. Therefore, angles of normals to the image side surface differ from incident angles of rays thereon, which does not sufficiently reduce the optical performance deterioration sensitivity for the decentering of the first lens unit.

Furthermore, in the zoom lens disclosed in Japanese Patent Laid-Open No. 08-086962, an object side convex surface of the negative lens formed of a high dispersion material and included in the first lens unit has a large curvature, which generates large chromatic aberration of magnification at a telephoto end.

In addition, in the zoom lens disclosed in Japanese Patent Laid-Open No. 2005-215389, an image side surface of the positive lens disposed closest to the image in the first lens unit is formed as a concave surface having a significantly large curvature, and therefore the optical performance deterioration sensitivity for the decentering of the first lens unit is low. However, an object side convex surface of the negative lens formed of a high dispersion material correspondingly has a significantly large curvature, which generates large chromatic aberration of magnification at a telephoto end.

Moreover, the zoom lens disclosed in Japanese Patent Laid-Open No. 2005-215389 reduces the chromatic aberration of magnification at the telephoto end by using a diffractive optical element. However, burden of the diffractive optical element to correct the chromatic aberration of magnification is too high and the chromatic aberration of magnification at a wide-angle end is excessively corrected, which is undesirable.

Furthermore, each embodiment of the present invention focuses on a lens barrel supporting mechanism generally employed in zoom lenses in which a first lens unit is moved during zooming, and specifies a decentering component easily generated in the lens barrel supporting mechanism to reduce an optical performance deterioration sensitivity for that decentering component.

Zoom lenses used for optical apparatuses such as interchangeable lenses are generally demanded to be compact. Thus, lengths of main bodies of optical apparatuses using a zoom lens in which a first lens unit is moved toward an object during zooming are decided based on a shortest entire length of the zoom lens at its wide-angle end. Then, such optical apparatuses often employ a structure causing the first lens unit and a first lens barrel holding it to move out toward the object from the main body during the zooming.

In this case, a position where the first lens barrel is supported by the main body (the position is hereinafter referred to as a "lens barrel supporting position") is located away from an apex of a most-object side surface of the first lens unit toward an image by a movement amount of the first lens unit or more. Therefore, a position of a center of gravity of the first lens unit is located greatly away from the lens barrel supporting position toward the object, which easily causes tilt decentering of the first lens unit such as rotation thereof in a direction of gravity about the lens barrel supporting position (rotation center position).

In such a case, setting a curvature radius of a certain surface of the first lens unit to be equal to a distance from the rotation center position to the certain surface prevents change of a state of rays impinging the certain surface before and after the rotational tilt decentering is generated. Thus, setting curvatures of respective surfaces of the first lens unit to be close to curvatures of concentric circles centering on the lens barrel supporting position makes it possible to greatly reduce the optical performance deterioration due to the above-described rotational tilt decentering.

Next, description will be made of conditions that should be satisfied or are desirable to be satisfied (not necessarily needed to be satisfied) by the zoom lens of each embodiment of the present invention, on the basis of the above-described principles.

As described above, the zoom lens of each embodiment moves the first lens unit being disposed closest to the object and having the positive optical power during the zooming from the wide-angle end to the telephoto end, thereby achieving a high variable magnification ratio.

The first lens unit being fixed (unmoved) during the zooming eliminates the engagement play between the first lens barrel that holds the first lens unit and the supporting lens barrel that supports the first lens barrel movably in the optical axis direction, thereby suppressing the optical performance deterioration due to the decentering of the first lens unit. However, achieving a high variable magnification ratio increases in size of the entire zoom lens and increases in optical power of each lens unit which invites the optical performance deterioration. Therefore, each embodiment moves the first lens unit during the zooming.

Each embodiment of the present invention places the positive meniscus lens having the image side concave surface at the position closest to the image in the first lens unit, and places the negative lens on the object side next to the positive meniscus lens. When f1 represents a focal length of the first lens unit, and Rpi represents a curvature radius of the image side concave surface of the positive meniscus lens, the following condition (1) is satisfied:

$$1.55 < Rpi/f1 < 2.90 \qquad (1)$$

Satisfying the condition (1) brings angles of rays (ray directions) emerging from the first lens unit toward the image close to directions of the normals to the image side concave surface as much as possible, which enables lowering of the optical performance deterioration sensitivity of the zoom lens for the decentering of the first lens unit. A value of Rpi/f1 exceeding the upper limit of the condition (1) causes the ray directions to differ from the directions of the normals to the image side concave surface, which increases the optical performance deterioration sensitivity of the zoom lens for the decentering of the first lens unit. A value of Rpi/f1 lower than the lower limit of the condition (1) makes it possible to lower the above-described optical performance deterioration sensitivity of the image side concave surface of the positive meniscus lens. However, such a value of Rpi/f1 excessively increases the curvature of the object side convex surface of the positive meniscus lens, the curvature generating an optical power required by the positive meniscus lens as a positive lens, which makes it difficult to correct various aberrations such as chromatic aberration of magnification.

It is more desirable to satisfy the following condition (1)' instead of the condition (1):

$$1.60 < Rpi/f1 < 2.80 \qquad (1)'$$

Each embodiment places the object side convex surface of the positive meniscus lens included in the first lens unit such that the object side convex surface is cemented to the image side concave surface of the negative lens disposed closer to the object than the positive meniscus lens, or such that an air lens having an extremely small optical power is formed between the object side convex surface and the image side concave surface. Such arrangement can cause the image side concave surface of the negative lens to cancel out the decentering aberration generated at the object side convex surface having a large curvature in the positive meniscus lens.

Moreover, it is desirable to satisfy the following condition (2) when td1 represents a movement amount of the first lens unit during the zooming from the wide-angle end to the telephoto end:

$$0.80 < Rpi/td1 < 9.00 \qquad (2)$$

Satisfying the condition (2) makes it possible to reduce the optical performance deterioration of the zoom lens for the decentering of the first lens unit as long as using the above-described general lens barrel supporting mechanism. A value of Rpi/td1 exceeding the upper limit of the condition (2) causes the curvature radius of the image side concave surface of the positive meniscus lens to differ from a distance from the above-described rotation center position to the image side concave surface, which increases the optical performance deterioration of the zoom lens for the decentering of the first lens unit. A value of Rpi/td1 lower than the lower limit of the condition (2) makes it possible to reduce the above-described optical performance deterioration of the image side concave surface of the positive meniscus lens. However, as with the condition (1), such a value of Rpi/td1 excessively increases the curvature of the object side convex surface of the positive meniscus lens, the curvature generating the optical power required by the positive meniscus lens as a positive lens, which makes it difficult to correct various aberrations such as chromatic aberration of magnification.

It is more desirable to satisfy the following condition (2)' instead of the condition (2):

$$3.40 < Rpi/td1 < 8.00 \qquad (2)'$$

Moreover, each embodiment places the negative meniscus lens having the object side convex surface at a position closer to the object than the positive meniscus lens in the first lens unit. It is desirable to satisfy the following condition (3) when Rno represents a curvature radius of the object side convex surface of the negative meniscus lens:

$$0.50 < Rpi/Rno < 6.00 \qquad (3)$$

Satisfying the condition (3) makes it possible to sufficiently correct chromatic aberration of magnification generated at the object side convex surface of the negative meniscus lens. A value of Rpi/Rno exceeding the upper limit of the condition (3) excessively increases a convergent optical power of the object side convex surface of the negative meniscus lens for off-axis rays, which invites excessive correction of the chromatic aberration of magnification. A value of Rpi/Rno lower than the lower limit of the condition (3) excessively increases the negative optical power of the negative meniscus lens, which makes it difficult to provide a necessary positive optical power of the first lens unit.

It is more desirable to satisfy the following condition (3)' instead of the condition (3):

$$2.00 < Rpi/Rno < 4.50 \qquad (3)'$$

Next, description will be made of a zoom lens that is another embodiment of the present invention, the zoom lens having a first lens unit whose configuration is different from that of the above-described zoom lens.

In the zoom lens of the other embodiment, the first lens unit includes a negative lens being disposed closest to the image and having an image side concave surface, and a positive lens being disposed on an object side next to the negative lens and having an object side convex surface. Such a configuration of the first lens unit also enables provision of similar effects to those of the above-described zoom lens.

This embodiment satisfies the following condition (4) when f1 represents a focal length of the first lens unit, and Rpo represents a curvature radius of the object side convex surface of the positive lens:

$$0.30 < Rpo/f1 < 3.00 \qquad (4)$$

Satisfying the condition (4) brings ray directions at the object side convex surface of the positive lens close to directions of normals to that object side convex surface as much as possible, which enables lowering of the optical performance deterioration sensitivity of the zoom lens for the decentering of the first lens unit. A value of Rpo/f1 exceeding the upper limit of the condition (4) causes the ray directions at the object side convex surface to differ from the directions of the normals to the object side convex surface, which increases the optical performance deterioration sensitivity of the zoom lens for the decentering of the first lens unit. A value of Rpo/f1 lower than the lower limit of the condition (4) causes the ray directions at the object side convex surface to differ from the directions of the normals to the object side convex surface in a direction inverse to that in the case where the value of Rpo/f1 exceeds the upper limit, which also increases the optical performance deterioration sensitivity of the zoom lens for the decentering of the first lens unit. Moreover, the value of Rpo/f1 lower than the lower limit of the condition (4) excessively increases a positive optical power of the object side convex surface, which makes correction of field curvature difficult.

It is more desirable to satisfy the following condition (4)' instead of the condition (4):

$$0.50 < Rpo/f1 < 2.00 \qquad (4)'$$

This embodiment places the image side convex surface of the positive lens included in the first lens unit such that the image side convex surface is cemented to the object side concave surface of the negative lens, or such that an air lens having an extremely small optical power is formed between the image side convex surface and the object side concave surface. Such arrangement can cause the object side concave surface of the negative lens to cancel out decentering aberration generated at the image side convex surface of the positive lens at which the ray directions differ from the directions of the normals to the image side convex surface.

Moreover, when td1 represents a movement amount of the first lens unit during the zooming from the wide-angle end to the telephoto end, it is desirable to satisfy the condition (5):

$$0.50 < Rpo/td1 < 8.00 \qquad (5)$$

Satisfying the condition (5) makes it possible to reduce the optical performance deterioration of the zoom lens for the decentering of the first lens unit as long as using the above-described general lens barrel supporting mechanism. A value of Rpo/td1 exceeding the upper limit of the condition (5) causes a curvature radius of the object side convex surface of the positive lens to differ from a distance from the above-described rotation center position to the object side convex surface, which increases the optical performance deterioration of the zoom lens for the decentering of the first lens unit. A value of Rpo/td1 lower than the lower limit of the condition (5) also causes the curvature radius of the object side convex surface of the positive lens to differ from the distance from the above-described rotation center position to the object side convex surface, which increases the optical performance deterioration of the zoom lens for the decentering of the first lens unit. Furthermore, the value of Rpo/td1 lower than the lower limit of the condition (5) excessively increases a curvature of the object side convex surface of the positive lens, which makes the correction of the field curvature difficult.

It is more desirable to satisfy the following condition (5)' instead of the condition (5):

$$0.70 < Rpo/td1 < 4.00 \qquad (5)'$$

Description will hereinafter be made of conditions that are desirable to be satisfied by each of the above-described embodiments.

First, when Nn represents a refractive index of a material forming the negative lens in the first lens unit, it is desirable to satisfy the following condition (6):

$$1.50 < Nn < 1.78 \qquad (6)$$

Satisfying the condition (6) prevents, when a positive lens side surface of the negative lens has a large curvature in order to reduce the optical performance deterioration sensitivity for the decentering of the first lens unit, excessive increase of a curvature of a surface opposite to the positive lens side surface of the negative lens, which enables sufficient aberration correction. A value of Nn exceeding the upper limit of the condition (6) increases the curvature of the surface opposite to the positive lens side surface of the negative lens, which makes correction of chromatic aberration of magnification excessive. A value of Nn lower than the lower limit of the condition (6) makes a Petzval sum of the first lens unit excessive, which increases the optical performance deterioration.

It is more desirable to satisfy the following condition (6)' instead of the condition (6):

$$1.55 < Nn < 1.68 \qquad (6)'$$

Moreover, when νdN represents an Abbe number of the material forming the negative lens in the first lens unit for a d-line, and θgF represents an anomalous partial dispersion ratio of the material forming the negative lens for a g-line, it is desirable to satisfy the following conditions (7) and (8):

$$20 < \nu dN < 55 \qquad (7)$$

$$-0.015 < \theta gF - 0.6438 + 0.001682 \times \nu dN < 0.002 \qquad (8)$$

Satisfying the conditions (7) and (8) enables sufficient correction of chromatic aberration of magnification for a C-line, an F-line and the g-line. A value of νdN exceeding the upper limit of the condition (7) makes the correction of the chromatic aberration of magnification for the C- and F-lines insufficient. A value of νdN lower than the lower limit of the condition (7) makes the correction of the chromatic aberration of magnification for the C- and F-lines excessive. A value of θgF−0.6438+0.001682×νdN exceeding the upper limit of the condition (8) makes the correction of the chromatic aberration of magnification for the g-line insufficient. A value of θgF−0.6438+0.001682×νdN lower than the lower limit of the condition (8) makes the correction of the chromatic aberration of magnification for the g-line excessive.

It is more desirable to satisfy the following conditions (7)' and (8)' instead of the conditions (7) and (8):

$$25 < \nu dN < 50 \qquad (7)'$$

$$-0.010 < \theta gF - 0.6438 + 0.001682 \times \nu dN < 0.000 \qquad (8)'$$

Furthermore, when tdt represents a distance from a most-object side surface of the first lens unit to a most-image side surface of the subsequent lens unit, that is, an entire length of the zoom lens at the telephoto end, and ft represents a focal length of the zoom lens at the telephoto end, it is desirable to satisfy the following condition (9):

$$0.2 < tdt/ft < 1.0 \qquad (9)$$

Satisfying the condition (9) makes it possible to achieve a compact zoom lens with high optical performance. A value of tdt/ft exceeding the upper limit of the condition (9) enables reduction of optical powers of the respective lens units and thereby enables suppression of the optical performance deterioration for the decentering of the first lens unit, but increases in size of the entire zoom lens. A value of tdt/ft lower than the lower limit of the condition (9) excessively increases the optical powers of the respective lens units, which makes it difficult to achieve the high optical performance over the entire focal length range.

It is more desirable to satisfy the following condition (9)' instead of the condition (9):

$$0.5 < tdt/ft < 0.9 \qquad (9)'$$

Moreover, it is desirable that the subsequent lens unit be disposed next to the first lens unit and include a second lens unit having a negative optical power. It is desirable that the second lens unit be unmoved during the zooming. Satisfying these conditions reduces a relative decentering amount of the first lens unit having the positive optical power and the second lens unit having the negative optical power due to manufacturing errors, which enables suppression of the optical performance deterioration.

Hereinafter, description will be made of specific embodiments of the present invention with reference to the drawings. FIGS. 1, 4, 7, 10 and 13 show cross-sectional configurations of the zoom lenses of first to fifth embodiments (Embodiments 1-5). Reference character Li (i=1, 2, 3, . . . ) denotes lens units disposed in order from the object side. Reference character SP denotes an aperture stop, and reference character IP denotes an image surface. Moreover, arrows in each figure show movement trajectories of the respective lens units during the zooming from the wide-angle end to the telephoto end.

FIGS. 2A, 5A, 8A, 11A and 14A show aberrations of the zoom lenses of Embodiments 1-5 at the wide-angle end (zoom position) and at an infinite end (focus position). FIGS. 2B, 5B, 8B, 11B and 14B show aberrations of the zoom lenses of Embodiments 1-5 at the telephoto end (zoom position) and at the infinite end. These figures show, in order from the left, spherical aberration (longitudinal chromatic aberration), astigmatism, distortion and chromatic aberration of magnification. In the figures of the spherical aberration and the chromatic aberration of magnification, a solid line shows these aberrations for the d-line (587.6 nm) and a broken line shows these aberrations for the g-line (435.8 nm). In the figure of the astigmatism, a solid line shows the astigmatism for the d-line in a sagittal direction, and a broken line shows the astigmatism for the d-line in a meridional direction. The figure of the distortion shows the distortion for the d-line.

FIGS. 3, 6, 9, 12 and 15 shows MTFs (modulation transfer functions) of the zoom lenses of Embodiments 1-5 at the telephoto end when the first lens unit is not decentered and after the first lens unit is decentered by five arc-minutes, at a central position corresponding to the optical axis and positions corresponding to image heights of ±15 mm from the central position. Each of these figures shows an MTF response at 30 lp/mm obtained by geometric optics calculation. A horizontal axis (scale) shows a defocus amount, and one division on the horizontal scale is 0.1 mm. A vertical axis (scale) shows the MTF response, and one division on the vertical scale is 10%. A solid line shows the MTF response in a sagittal direction, and a broken line shows the MTF response in a meridional direction.

In these figures, the decentering given to the first lens unit is s tilt decentering of five arc-minutes about a point away from an apex of the most-image side surface of the first lens unit toward the image by a movement amount of the first lens unit from its wide-angle end position to its telephoto end position.

In addition, Numerical Examples 1-5 respectively show lens data of the zoom lenses of Embodiments 1-5. In each numerical example, i represents numbers of optical surfaces in order from the object side (magnifying conjugate side), and r represents a curvature radius of each optical surface. Moreover, d represents a distance between the i-th optical surface and the (i+1)-th optical surface, and vd and nd respectively represents a refractive index and an Abbe number for the d-line of each optical member (each lens and the aperture stop). In addition, an effective diameter of each optical member is shown.

Furthermore, each numerical example shows a zoom ratio, a focal length and an F-number of each zoom lens, and a field angle (a half field angle of the entire zoom lens), an image height (a maximum image height corresponding to the half field angle) and an entire zoom lens length (a distance from the most-object side (first) lens surface to the most-image side (last) lens surface). BF represents a back focus, which is a length from the last lens surface to the image surface.

The distance d shown by "(variable)" means a distance variable with the zooming. Each numerical example shows some values of the variable distance d corresponding to some focal lengths.

Table 1 shows values of the above-described conditions (1)-(9) of Numerical Examples 1-5.

Embodiment 1

The zoom lens of Embodiment 1 (Numerical Example 1) shown in FIG. 1 includes, in order from the object side, the first lens unit L1 having a positive optical power, the second lens unit L2 having a negative optical power, a third lens unit L3 having a positive optical power, a fourth lens unit L4 having a negative optical power, a fifth lens unit L5 having a positive optical power and a sixth lens unit L6 having a negative optical power. The half field angle at the telephoto end is 4.2 degrees.

The first lens unit L1 is constituted by, in order from the object side, the positive lens, and a cemented lens formed by cementing the negative meniscus lens having the object side convex surface to the positive meniscus lens having the image side concave surface.

The zoom lens of this embodiment satisfies the condition (1) for the image side concave surface of the positive meniscus lens in the first lens unit L1. The satisfaction of the condition (1) brings the ray directions at the image side concave surface close to the directions of the normals to that image side concave surface to enable reduction of the optical performance deterioration of the zoom lens for the decentering of the first lens unit L1.

Moreover, the zoom lens of this embodiment satisfies the condition (2) for the image side concave surface of the positive meniscus lens in the first lens unit L1. The satisfaction of the condition (2) enables reduction of the optical performance deterioration of the zoom lens for rotational decentering (tilt decenterng) of the first lens unit L1 generated in the general lens barrel supporting mechanism.

Moreover, the zoom lens of this embodiment satisfies the condition (3) for the object side convex surface of the negative meniscus lens in the first lens unit L1. The satisfaction of the condition (3) enables sufficient correction of the chromatic aberration of magnification.

In addition, the zoom lens of this embodiment satisfies the condition (6) for the material forming the negative meniscus lens in the first lens unit L1. The satisfaction of the condition (6) prevents an excessive curvature of the object side convex surface, and thus enables sufficient aberration correction.

Furthermore, the zoom lens of this embodiment satisfies the conditions (7) and (8) for the material forming the negative meniscus lens in the first lens unit L1. The satisfaction of the conditions (7) and (8) enables sufficient correction of the chromatic aberration of magnification for the C-, F- and g-lines.

Moreover, the zoom lens of this embodiment satisfies the condition (9) for a relationship between the focal length and the entire length of the zoom lens at the telephoto end. The satisfaction of the conditions (9) realizes a compact zoom lens with high optical performance.

In this embodiment, the second lens unit L2 having the negative optical power is unmoved during the zooming. This reduces a relative decentering amount between the first lens unit L1 having the positive optical power and the second lens unit L2 to suppress the optical performance deterioration.

Embodiment 2

Figure 4:
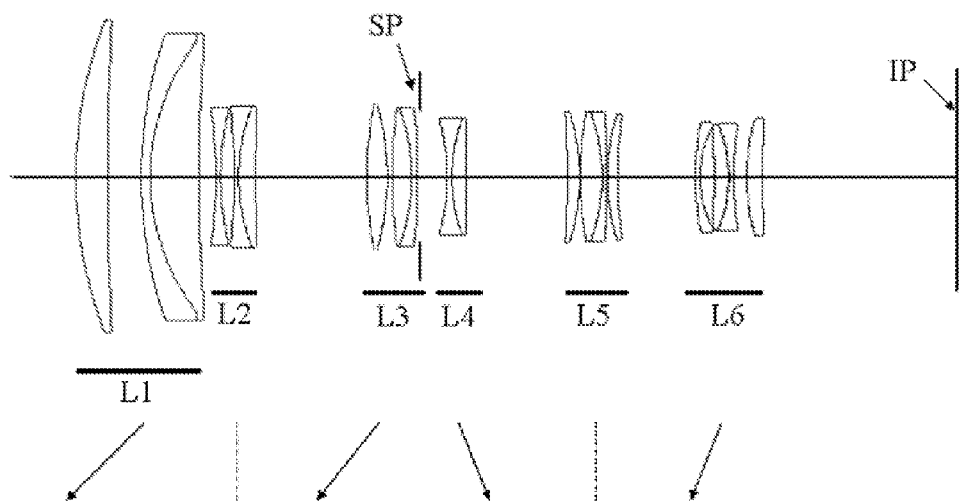
FIG. 4 is a cross-sectional view showing a configuration of a zoom lens that is Embodiment 2 of the present invention.
Figure 5A:
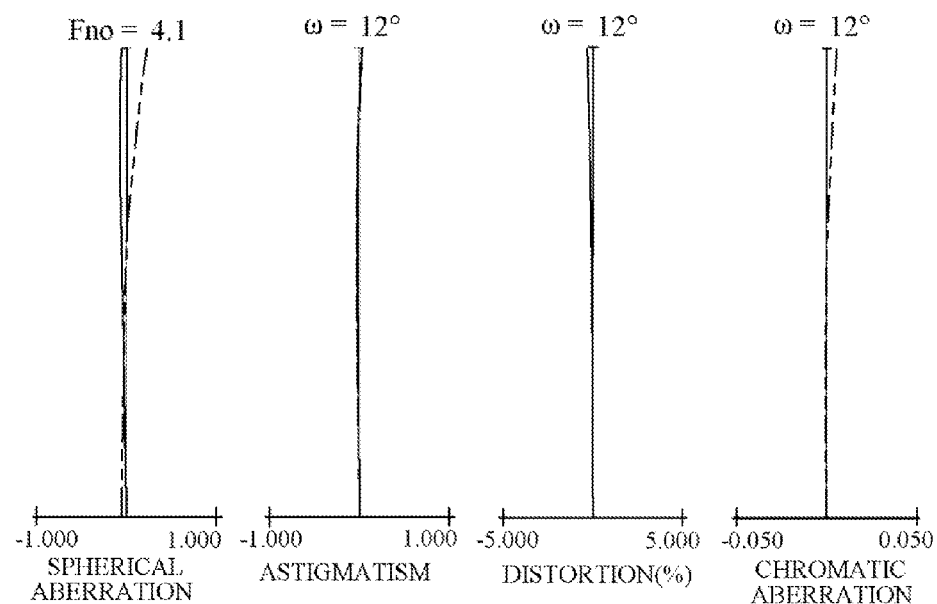
FIG. 5A shows aberrations of a zoom lens of Numerical Example 2 of the present invention at a wide-angle end zoom position and an infinite end focus position.
Figure 5B:
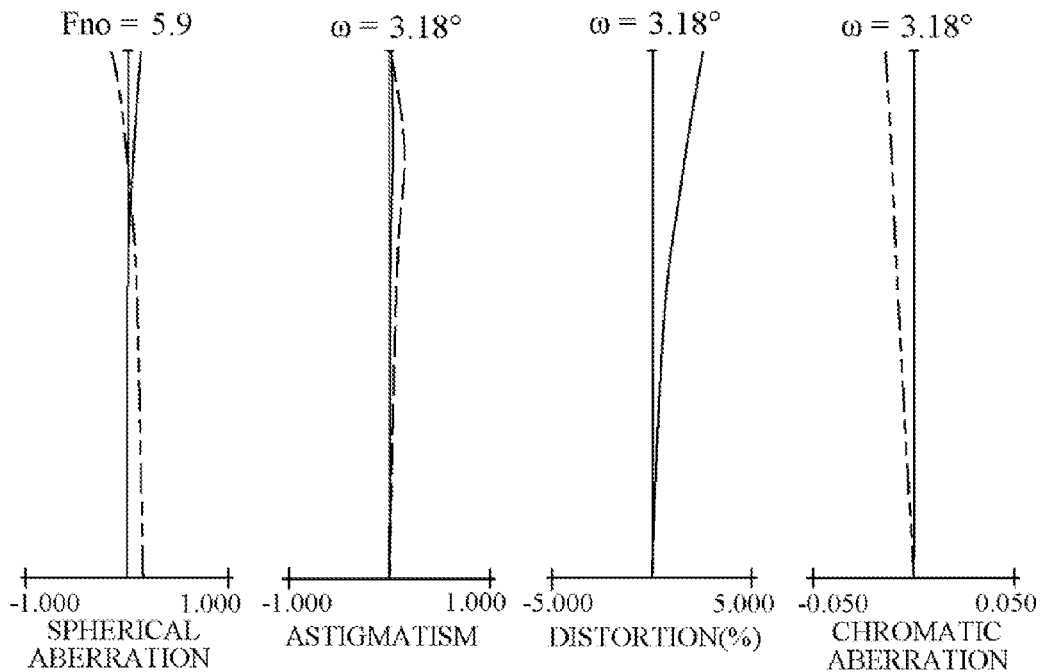
FIG. 5B shows aberrations of the zoom lens of Numerical Example 2 at a telephoto end zoom position and the infinite end focus position.
Figure 6:
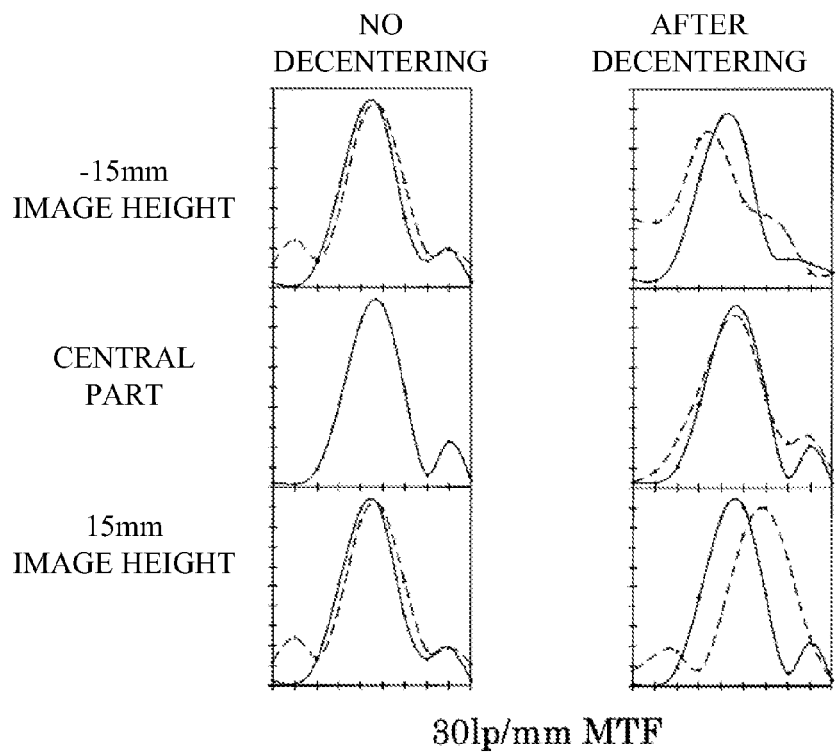
FIG. 6 shows variation of MTF when decentering of a first lens unit in the zoom lens of Numerical Example 2 is generated at the telephoto end.

The zoom lens of Embodiment 2 (Numerical Example 2) shown in FIG. 4 includes, in order from the object side, the first lens unit L1 having a positive optical power, the second lens unit L2 having a negative optical power, a third lens unit L3 having a positive optical power, a fourth lens unit L4 having a negative optical power, a fifth lens unit L5 having a positive optical power and a sixth lens unit L6 having a negative optical power. The half field angle at the telephoto end is 3.2 degrees.

The zoom lens of this embodiment satisfies the conditions (1)-(3) and the conditions (6)-(9). The second lens unit L2 having the negative optical power is unmoved during the zooming.

Embodiment 3

Figure 7:
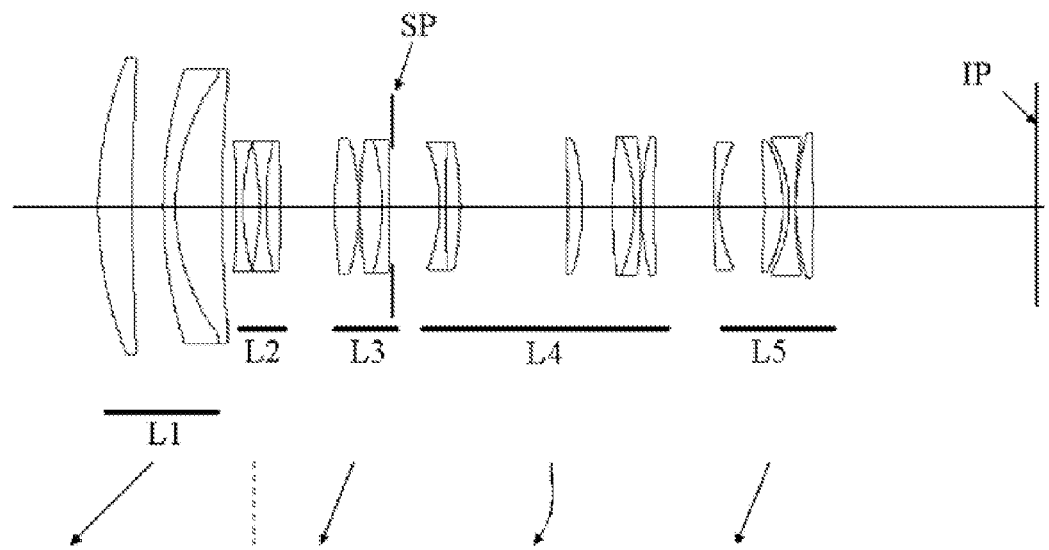
FIG. 7 is a cross-sectional view showing a configuration of a zoom lens that is Embodiment 3 of the present invention.
Figure 8A:
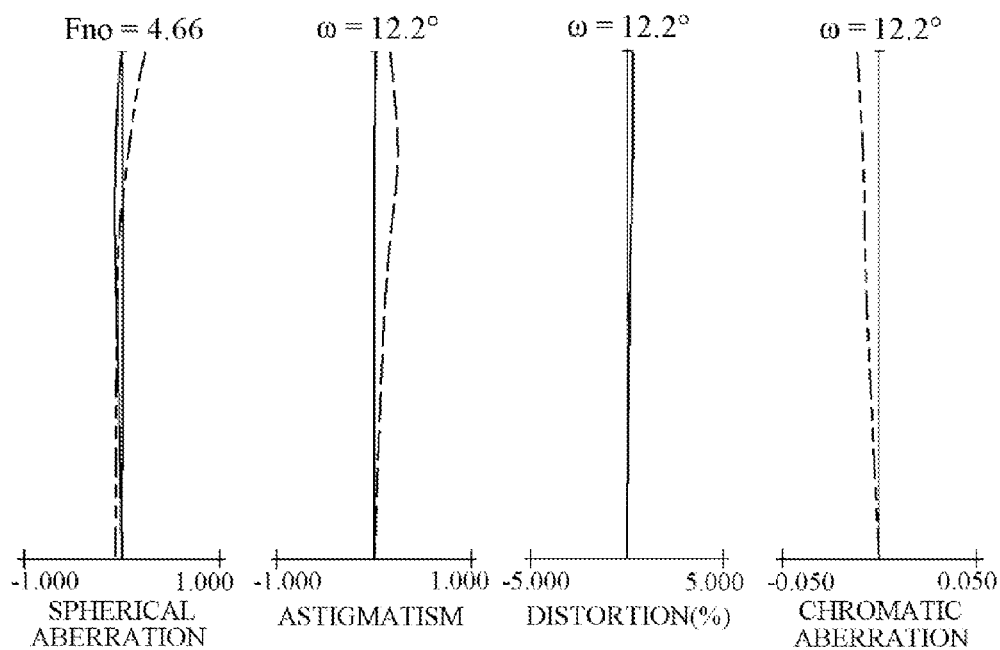
FIG. 8A shows aberrations of a zoom lens of Numerical Example 3 of the present invention at a wide-angle end zoom position and an infinite end focus position.
Figure 8B:
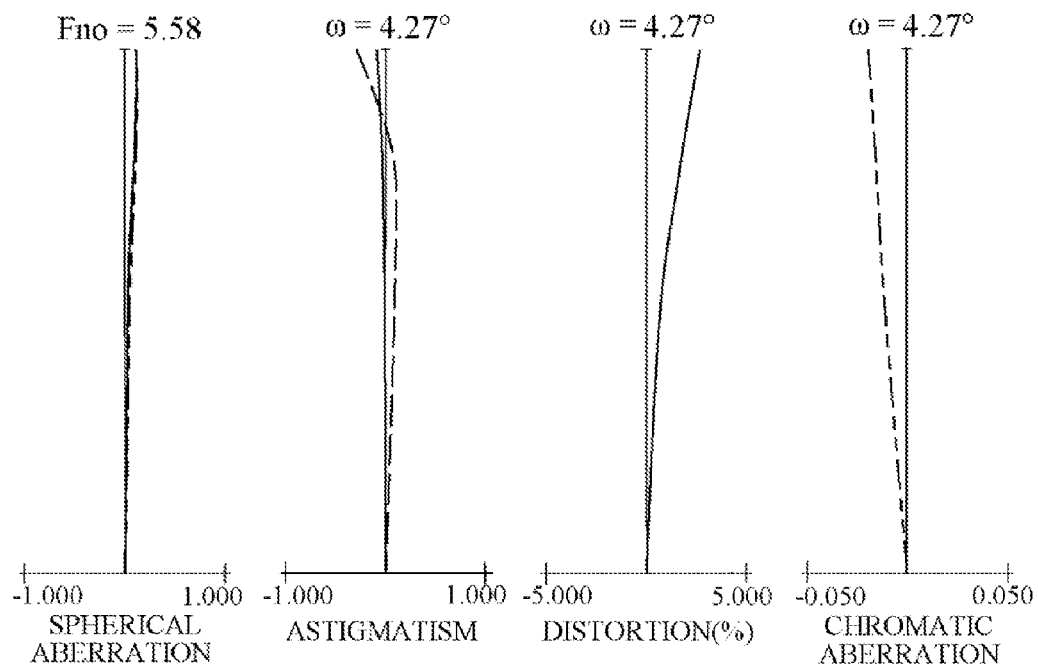
FIG. 8B shows aberrations of the zoom lens of Numerical Example 3 at a telephoto end zoom position and the infinite end focus position.
Figure 9:
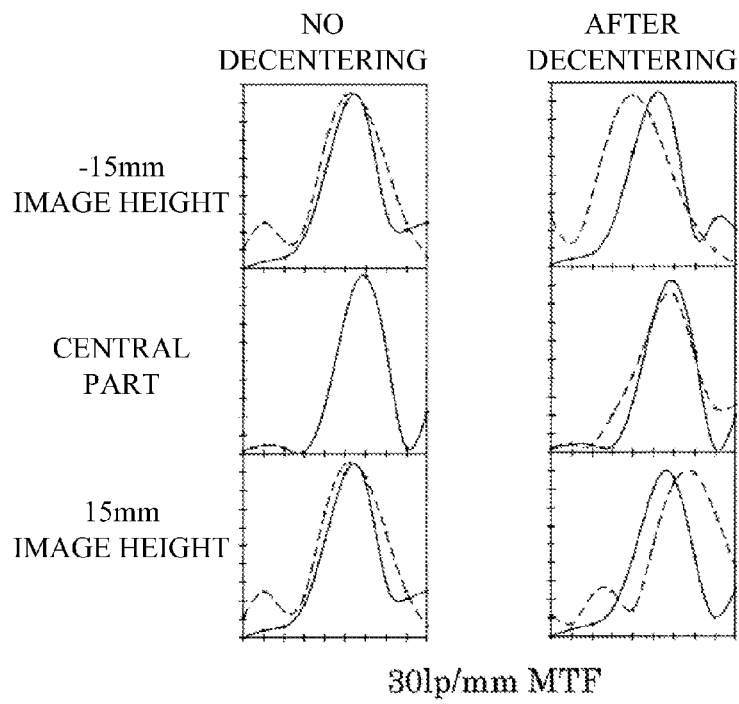
FIG. 9 shows variation of MTF when decentering of a first lens unit in the zoom lens of Numerical Example 3 is generated at the telephoto end.

The zoom lens of Embodiment 3 (Numerical Example 3) shown in FIG. 7 includes, in order from the object side, the first lens unit L1 having a positive optical power, the second lens unit L2 having a negative optical power, a third lens unit L3 having a negative optical power, a fourth lens unit L4 having a positive optical power and a fifth lens unit L5 having a negative optical power. The half field angle at the telephoto end is 4.2 degrees.

The zoom lens of this embodiment satisfies the conditions (1)-(3) and the conditions (6)-(9). The second lens unit L2 having the negative optical power is unmoved during the zooming.

Embodiment 4

Figure 10:
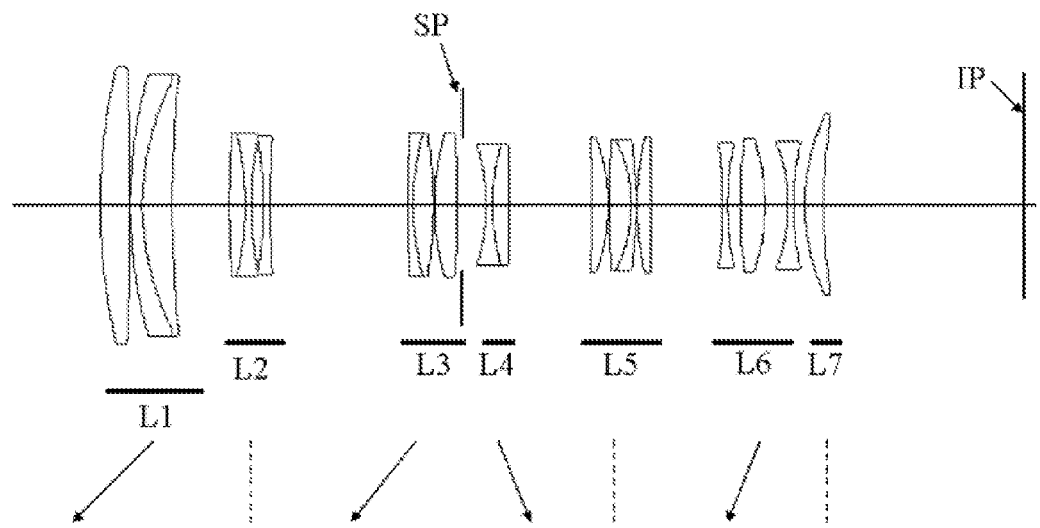
FIG. 10 is a cross-sectional view showing a configuration of a zoom lens that is Embodiment 4 of the present invention.
Figure 11A:
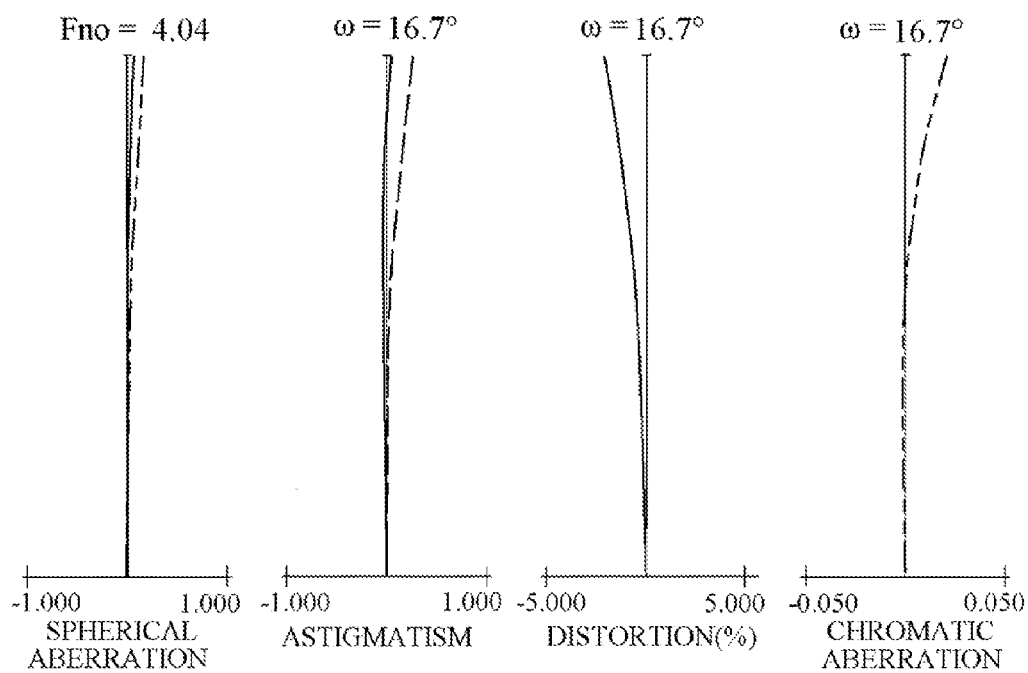
FIG. 11A shows aberrations of a zoom lens of Numerical Example 4 of the present invention at a wide-angle end zoom position and an infinite end focus position.
Figure 11B:
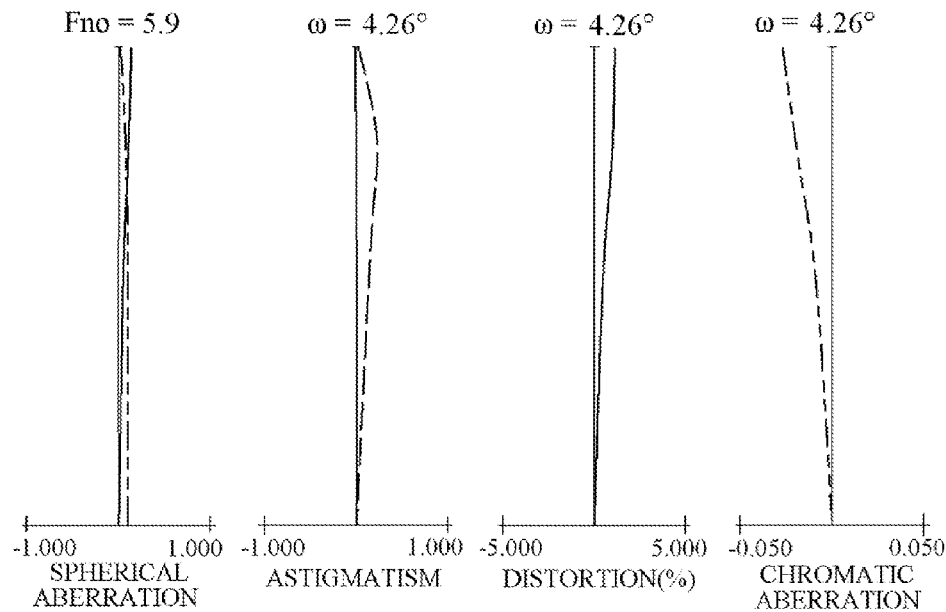
FIG. 11B shows aberrations of the zoom lens of Numerical Example 4 at a telephoto end zoom position and the infinite end focus position.
Figure 12:
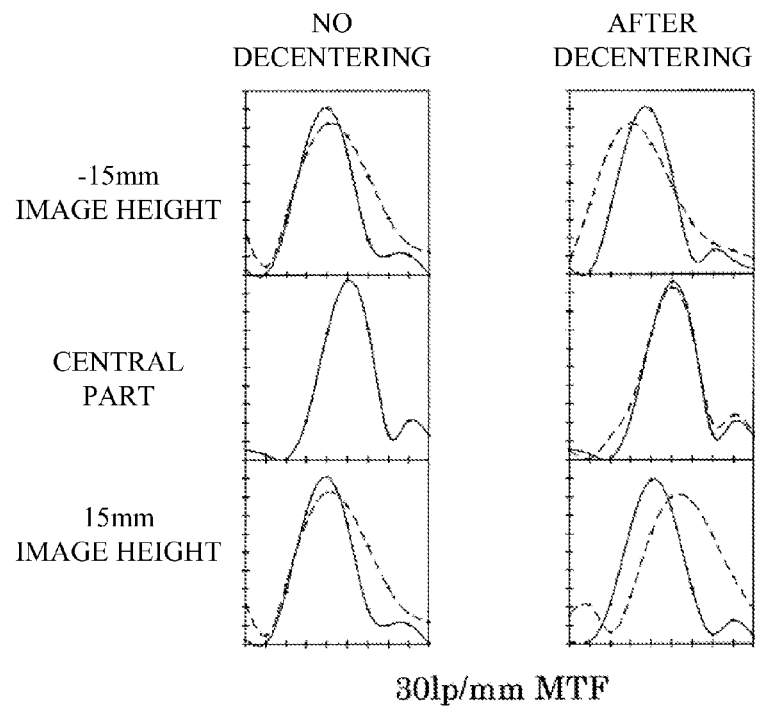
FIG. 12 shows variation of MTF when decentering of a first lens unit in the zoom lens of Numerical Example 4 is generated at the telephoto end.

The zoom lens of Embodiment 4 (Numerical Example 4) shown in FIG. 10 includes, in order from the object side, the first lens unit L1 having a positive optical power, the second lens unit L2 having a negative optical power, a third lens unit L3 having a positive optical power, a fourth lens unit L4 having a negative optical power, a fifth lens unit L5 having a positive optical power, a sixth lens unit L6 having a negative optical power and a seventh lens unit L7 having a positive optical power. The half field angle at the telephoto end is 4.2 degrees.

The zoom lens of this embodiment satisfies the conditions (1)-(3) and the conditions (6)-(9). The second lens unit L2 having the negative optical power is unmoved during the zooming.

Embodiment 5

Figure 13:
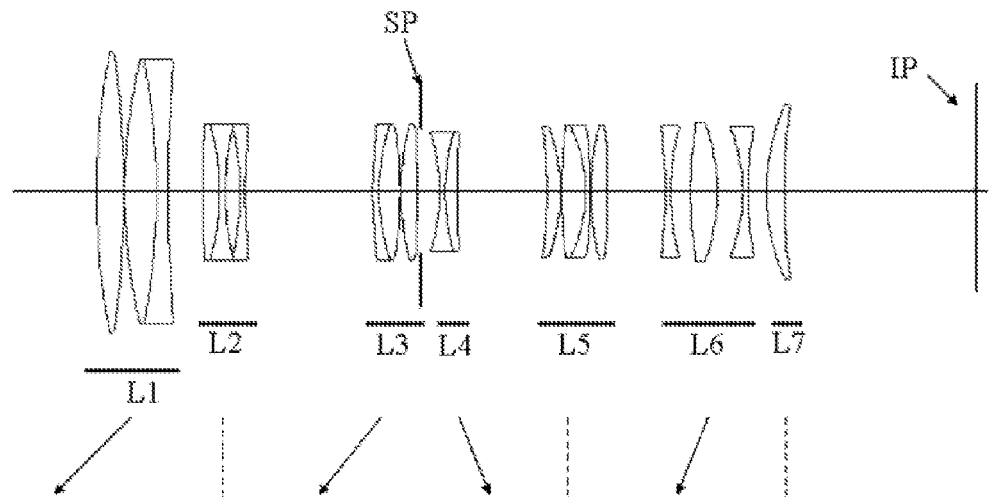
FIG. 13 is a cross-sectional view showing a configuration of a zoom lens that is Embodiment 5 of the present invention.
Figure 14A:
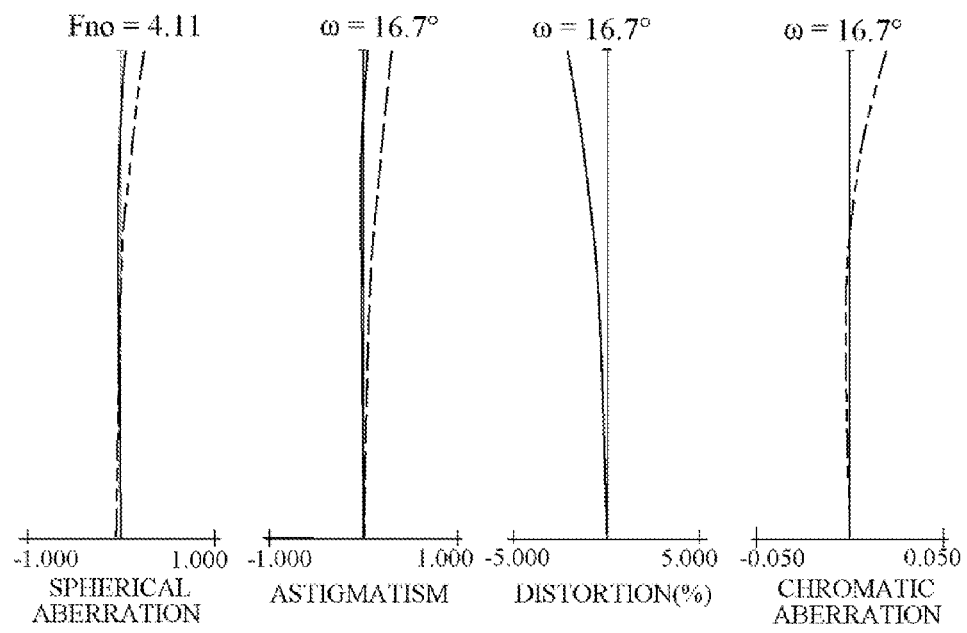
FIG. 14A shows aberrations of a zoom lens of Numerical Example 5 of the present invention at a wide-angle end zoom position and an infinite end focus position.
Figure 14B:
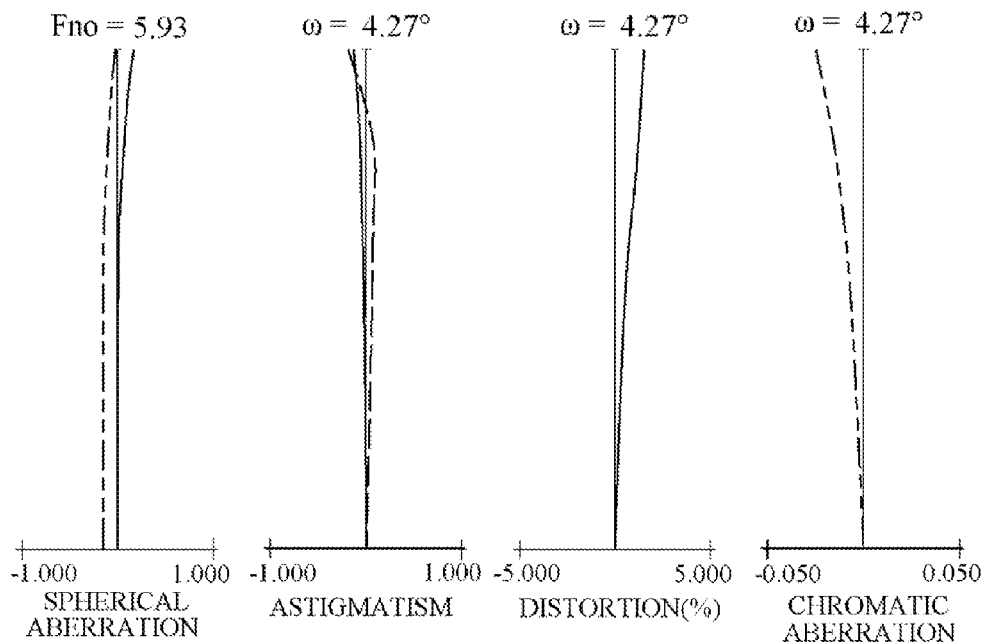
FIG. 14B shows aberrations of the zoom lens of Numerical Example 5 at a telephoto end zoom position and the infinite end focus position.
Figure 15:
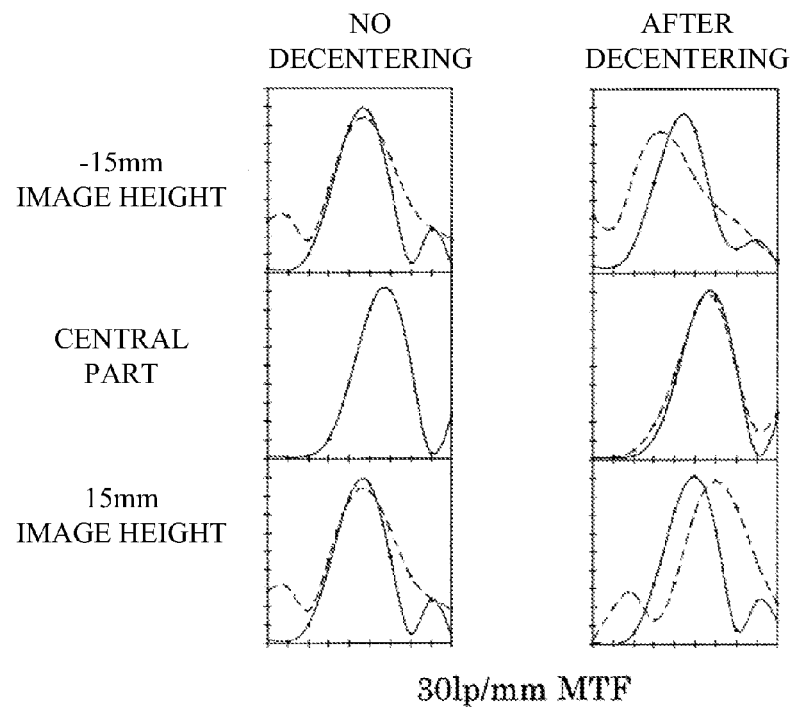
FIG. 15 shows variation of MTF when decentering of a first lens unit in the zoom lens of Numerical Example 5 is generated at the telephoto end.

The zoom lens of Embodiment 5 (Numerical Example 5) shown in FIG. 13 includes, in order from the object side, the first lens unit L1 having a positive optical power, the second lens unit L2 having a negative optical power, a third lens unit L3 having a positive optical power, a fourth lens unit L4 having a negative optical power, a fifth lens unit L5 having a positive optical power and a sixth lens unit L6 having a negative optical power. The half field angle at the telephoto end is 3.2 degrees.

The first lens unit L1 is constituted by, in order from the object side, the positive lens, and a cemented lens formed by cementing a biconvex lens and a biconcave lens.

The zoom lens of this embodiment satisfies the condition (4) for the object side convex surface of the biconvex lens in the first lens unit L1. The satisfaction of the condition (4) brings the ray directions at the object side convex surface close to the directions of the normals to that object side convex surface to enable reduction of the optical performance deterioration of the zoom lens for the decentering of the first lens unit L1.

Moreover, the zoom lens of this embodiment satisfies the condition (5) for the image side convex surface of the biconvex lens in the first lens unit L1. The satisfaction of the condition (5) enables reduction of the optical performance deterioration of the zoom lens for rotational decentering (tilt decenterng) of the first lens unit L1 generated in the general lens barrel supporting mechanism.

In addition, the zoom lens of this embodiment satisfies the condition (6) for a material forming the biconcave lens in the first lens unit L1. The satisfaction of the condition (6) prevents an excessively large curvature of the image side concave surface, and thus enables sufficient aberration correction.

Furthermore, the zoom lens of this embodiment satisfies the conditions (7) and (8) for the material forming the biconcave lens in the first lens unit L1. The satisfaction of the conditions (7) and (8) enables sufficient correction of the chromatic aberration of magnification for the C-, F- and g-lines.

Moreover, the zoom lens of this embodiment satisfies the condition (9) for a relationship between the focal length and the entire length of the zoom lens at the telephoto end. The satisfaction of the conditions (9) realizes a compact zoom lens with high optical performance.

In this embodiment, the second lens unit L2 having the negative optical power is unmoved during the zooming. This reduces a relative decentering amount between the first lens unit L1 having the positive optical power and the second lens unit L2 to suppress the optical performance deterioration.

Numerical Example 1

Unit mm
SURFACE DATA

| SURFACE NO. | r | d | nd | vd | EFFECTIVE DIAMETER |
|---|---|---|---|---|---|
| 1 | 92.444 | 6.50 | 1.48749 | 70.2 | 57.00 |
| 2 | 54691.362 | 0.15 | | | 56.40 |
| 3 | 97.867 | 2.40 | 1.61340 | 44.3 | 54.82 |
| 4 | 43.715 | 9.82 | 1.49700 | 81.5 | 51.65 |
| 5 | 337.720 | (VARIABLE) | | | 50.75 |
| 6 | −358.052 | 1.30 | 1.83481 | 42.7 | 24.40 |
| 7 | 48.879 | 3.36 | | | 23.70 |
| 8 | −47.573 | 1.20 | 1.63854 | 55.4 | 23.70 |
| 9 | 57.047 | 2.90 | 1.84666 | 23.8 | 24.52 |
| 10 | −351.696 | (VARIABLE) | | | 24.70 |
| 11 | 119.293 | 4.28 | 1.49700 | 81.5 | 26.13 |
| 12 | −55.282 | 0.15 | | | 26.12 |
| 13 | 79.913 | 4.69 | 1.60311 | 60.6 | 25.43 |
| 14 | −46.795 | 1.30 | 1.85026 | 32.3 | 24.87 |
| 15 | −361.577 | 1.00 | | | 24.40 |
| 16(STOP) | ∞ | (VARIABLE) | | | 24.40 |
| 17 | −40.084 | 1.20 | 1.70154 | 41.2 | 22.80 |
| 18 | 37.914 | 3.81 | 1.80518 | 25.4 | 23.47 |
| 19 | −151.434 | (VARIABLE) | | | 23.60 |
| 20 | −236.025 | 2.90 | 1.69680 | 55.5 | 25.20 |
| 21 | −45.412 | 0.15 | | | 25.61 |
| 22 | 91.423 | 4.77 | 1.60311 | 60.6 | 25.80 |
| 23 | −33.874 | 1.20 | 1.84666 | 23.8 | 25.72 |
| 24 | −204.484 | 0.15 | | | 25.90 |
| 25 | 56.181 | 2.32 | 1.77250 | 49.6 | 25.89 |
| 26 | 166.987 | (VARIABLE) | | | 25.60 |
| 27 | 105.084 | 1.20 | 1.88300 | 40.8 | 24.65 |
| 28 | 30.346 | 4.69 | | | 23.94 |
| 29 | −141.521 | 2.99 | 1.80518 | 25.4 | 24.46 |
| 30 | −35.789 | 3.64 | | | 24.79 |
| 31 | −31.158 | 1.20 | 1.88300 | 40.8 | 24.30 |
| 32 | 177.055 | 2.14 | | | 25.60 |

-continued

| 33 | 62.632   | 3.42 | 1.69895 | 30.1 | 28.29 |
| 34 | -205.770 |      |         |      | 28.63 |

VARIOUS DATA
ZOOM RATIO 4.02

|  | WIDE-ANGLE | MIDDELE | TELEPHOTO |
|---|---|---|---|
| FOCAL LENGTH | 72.20 | 135.00 | 290.00 |
| F-NUMBER | 4.20 | 4.67 | 5.86 |
| FIELD ANGLE | 16.68 | 9.10 | 4.27 |
| IMAGE HEIGHT | 21.64 | 21.64 | 21.64 |
| ENTIRE LENS LENGTH | 185.20 | 214.53 | 239.20 |
| BF | 46.74 | 47.82 | 57.41 |
| d 5 | 2.78 | 32.18 | 56.78 |
| d10 | 26.47 | 14.15 | 1.28 |
| d16 | 6.01 | 24.56 | 44.99 |
| d19 | 16.39 | 10.16 | 2.60 |
| d26 | 11.97 | 10.82 | 1.30 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1  | 133.29  | 18.87 | -0.79 | -13.15 |
| 2 | 6  | -36.99  | 8.76  | 1.25  | -5.12  |
| 3 | 11 | 56.33   | 11.42 | 1.86  | -5.78  |
| 4 | 17 | -108.86 | 5.01  | -1.84 | -4.73  |
| 5 | 20 | 40.19   | 11.50 | 2.88  | -4.10  |
| 6 | 27 | -47.63  | 19.28 | 1.44  | -14.11 |

Numerical Example 2

Unit mm
SURFACE DATA

| SURFACE NO. | r | d | nd | vd | EFFECTIVE DIAMETER |
|---|---|---|---|---|---|
| 1 | 112.245 | 8.24 | 1.48749 | 70.2 | 78.98 |
| 2 | 818.546 | 8.56 |  |  | 78.35 |
| 3 | 112.240 | 2.40 | 1.65412 | 39.7 | 72.52 |
| 4 | 57.000 | 12.49 | 1.49700 | 81.5 | 68.44 |
| 5 | 460.632 | (VARIABLE) |  |  | 67.49 |
| 6 | -134.957 | 1.30 | 1.83481 | 42.7 | 34.25 |
| 7 | 73.912 | 3.44 |  |  | 33.62 |
| 8 | -169.877 | 1.20 | 1.63854 | 55.4 | 33.75 |
| 9 | 49.778 | 4.29 | 1.84666 | 23.8 | 34.87 |
| 10 | 384.898 | (VARIABLE) |  |  | 35.04 |
| 11 | 94.644 | 5.25 | 1.49700 | 81.5 | 36.17 |
| 12 | -65.896 | 1.39 |  |  | 36.18 |
| 13 | 142.384 | 4.98 | 1.60311 | 60.6 | 34.81 |
| 14 | -49.084 | 1.30 | 1.85026 | 32.3 | 34.64 |
| 15 | -219.291 | 1.00 |  |  | 34.34 |
| 16(STOP) | ∞ | (VARIABLE) |  |  | 33.76 |
| 17 | -56.853 | 1.20 | 1.70154 | 41.2 | 28.44 |
| 18 | 42.487 | 3.72 | 1.80518 | 25.4 | 28.95 |
| 19 | 2312.557 | (VARIABLE) |  |  | 29.05 |
| 20 | -237.307 | 3.24 | 1.69680 | 55.5 | 32.30 |
| 21 | -56.242 | 0.15 |  |  | 32.54 |
| 22 | 93.548 | 5.62 | 1.60311 | 60.6 | 32.13 |
| 23 | -48.146 | 1.20 | 1.84666 | 23.8 | 31.91 |
| 24 | -267.638 | 0.15 |  |  | 31.83 |
| 25 | 54.136 | 2.69 | 1.77250 | 49.6 | 31.44 |
| 26 | 111.893 | (VARIABLE) |  |  | 31.03 |
| 27 | 69.759 | 1.20 | 1.88300 | 40.8 | 27.18 |
| 28 | 27.923 | 3.63 |  |  | 25.84 |
| 29 | -812.233 | 3.73 | 1.80518 | 25.4 | 25.86 |
| 30 | -35.322 | 0.15 |  |  | 25.92 |
| 31 | -33.777 | 1.20 | 1.88300 | 40.8 | 25.90 |
| 32 | 84.416 | 3.29 |  |  | 26.36 |

-continued

| 33 | 52.523  | 4.16 | 1.69895 | 30.1 | 28.97 |
| 34 | 347.061 |      |         |      | 29.29 |

VARIOUS DATA
ZOOM RATIO 3.82

|  | WIDE-ANGLE | MIDDELE | TELEPHOTO |
|---|---|---|---|
| FOCAL LENGTH | 102.20 | 200.00 | 390.01 |
| F-NUMBER | 4.10 | 4.55 | 5.90 |
| FIELD ANGLE | 11.95 | 6.17 | 3.18 |
| IMAGE HEIGHT | 21.64 | 21.64 | 21.64 |
| ENTIRE LENS LENGTH | 228.18 | 258.83 | 288.12 |
| BF | 51.23 | 54.42 | 69.84 |
| d 5 | 4.30 | 35.00 | 64.30 |
| d10 | 28.74 | 9.52 | 1.28 |
| d16 | 6.73 | 33.56 | 50.14 |
| d19 | 26.03 | 18.42 | 10.08 |
| d26 | 19.98 | 16.74 | 1.30 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1  | 173.79 | 31.69 | 1.92  | -21.82 |
| 2 | 6  | -51.34 | 10.23 | 0.98  | -6.16  |
| 3 | 11 | 63.90  | 13.92 | 2.60  | -7.17  |
| 4 | 17 | -97.68 | 4.92  | -0.07 | -2.84  |
| 5 | 20 | 46.77  | 13.04 | 3.05  | -4.82  |
| 6 | 27 | -46.99 | 17.37 | 0.30  | -12.98 |

Numerical Example 3

Unit mm
SURFACE DATA

| SURFACE NO. | r | d | nd | vd | EFFECTIVE DIAMETER |
|---|---|---|---|---|---|
| 1 | 78.189 | 6.76 | 1.48749 | 70.2 | 57.00 |
| 2 | 596.636 | 6.03 |  |  | 55.98 |
| 3 | 89.022 | 2.40 | 1.65412 | 39.7 | 52.38 |
| 4 | 43.034 | 9.16 | 1.49700 | 81.5 | 49.47 |
| 5 | 282.939 | (VARIABLE) |  |  | 48.58 |
| 6 | -174.380 | 1.30 | 1.83481 | 42.7 | 24.40 |
| 7 | 45.780 | 3.23 |  |  | 23.45 |
| 8 | -54.505 | 1.20 | 1.63854 | 55.4 | 23.47 |
| 9 | 55.262 | 3.02 | 1.84666 | 23.8 | 24.23 |
| 10 | -168.683 | (VARIABLE) |  |  | 24.38 |
| 11 | 92.709 | 4.65 | 1.49700 | 81.5 | 25.15 |
| 12 | -46.816 | 0.15 |  |  | 25.11 |
| 13 | 84.858 | 4.38 | 1.60311 | 60.6 | 24.24 |
| 14 | -50.603 | 1.30 | 1.85026 | 32.3 | 23.59 |
| 15 | 3552.998 | 1.00 |  |  | 25.00 |
| 16(STOP) | ∞ | (VARIABLE) |  |  | 23.00 |
| 17 | -34.063 | 1.20 | 1.70154 | 41.2 | 22.40 |
| 18 | 218.901 | 2.85 | 1.80518 | 25.4 | 22.70 |
| 19 | -67.950 | 21.17 |  |  | 23.60 |
| 20 | -226.863 | 2.81 | 1.69680 | 55.5 | 25.20 |
| 21 | -47.651 | 5.94 |  |  | 25.37 |
| 22 | 105.921 | 4.29 | 1.60311 | 60.6 | 25.81 |
| 23 | -37.342 | 1.20 | 1.84666 | 23.8 | 25.73 |
| 24 | -163.376 | 0.15 |  |  | 25.86 |
| 25 | 51.533 | 2.47 | 1.77250 | 49.6 | 25.78 |
| 26 | 216.140 | (VARIABLE) |  |  | 25.60 |
| 27 | 134.864 | 1.20 | 1.88300 | 40.8 | 23.90 |
| 28 | 28.564 | 8.79 |  |  | 22.97 |
| 29 | -200.612 | 3.76 | 1.80518 | 25.4 | 24.52 |
| 30 | -27.680 | 1.14 |  |  | 24.81 |
| 31 | -25.909 | 1.20 | 1.88300 | 40.8 | 24.41 |
| 32 | 75.617 | 0.15 |  |  | 26.03 |

-continued

| 33 | 46.758 | 3.37 | 1.69895 | 30.1 | 27.06 |
| 34 | −543.867 | | | | 27.38 |

VARIOUS DATA
ZOOM RATIO 2.90

| | WIDE-ANGLE | MIDDELE | TELEPHOTO |
|---|---|---|---|
| FOCAL LENGTH | 100.00 | 150.01 | 290.00 |
| F-NUMBER | 4.66 | 4.78 | 5.58 |
| FIELD ANGLE | 12.21 | 8.21 | 4.27 |
| IMAGE HEIGHT | 21.64 | 21.64 | 21.64 |
| ENTIRE LENS LENGTH | 185.20 | 214.42 | 239.10 |
| BF | 44.85 | 43.51 | 69.02 |
| d 5 | 2.78 | 32.01 | 56.78 |
| d10 | 10.63 | 8.90 | 1.28 |
| d16 | 8.96 | 15.29 | 4.45 |
| d26 | 11.70 | 8.45 | 1.30 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1 | 134.13 | 24.35 | −0.11 | −17.97 |
| 2 | 6 | −38.83 | 8.75 | 0.36 | −6.05 |
| 3 | 11 | 55.35 | 11.48 | 1.44 | −6.20 |
| 4 | 17 | 40.01 | 42.07 | 31.64 | 4.33 |
| 5 | 27 | −34.39 | 19.62 | 2.69 | −12.09 |

Numerical Example 4

Unit mm
SURFACE DATA

| SURFACE NO. | r | d | nd | vd | EFFECTIVE DIAMETER |
|---|---|---|---|---|---|
| 1 | 116.158 | 5.57 | 1.48749 | 70.2 | 52.00 |
| 2 | −1084.393 | 0.15 | | | 51.24 |
| 3 | 90.705 | 2.40 | 1.61340 | 44.3 | 49.16 |
| 4 | 53.198 | 5.71 | 1.43875 | 94.9 | 46.80 |
| 5 | 265.645 | (VARIABLE) | | | 46.00 |
| 6 | 306.636 | 2.97 | 1.84666 | 23.8 | 25.97 |
| 7 | −57.640 | 1.20 | 1.80400 | 46.6 | 25.50 |
| 8 | 67.050 | 2.35 | | | 24.50 |
| 9 | −71.849 | 1.20 | 1.83481 | 42.7 | 24.49 |
| 10 | 174.072 | (VARIABLE) | | | 25.60 |
| 11 | 157.780 | 1.20 | 1.84666 | 23.8 | 25.60 |
| 12 | 52.668 | 3.88 | 1.60311 | 60.6 | 26.02 |
| 13 | −81.344 | 0.15 | | | 26.22 |
| 14 | 48.254 | 4.28 | 1.49700 | 81.5 | 26.46 |
| 15 | −297.221 | 1.00 | | | 26.17 |
| 16(STOP) | ∞ | (VARIABLE) | | | 25.60 |
| 17 | −38.358 | 1.20 | 1.63854 | 55.4 | 22.00 |
| 18 | 40.466 | 3.03 | 1.84666 | 23.8 | 22.14 |
| 19 | 280.105 | (VARIABLE) | | | 22.00 |
| 20 | −133.734 | 3.03 | 1.69680 | 55.5 | 24.20 |
| 21 | −35.225 | 0.15 | | | 24.60 |
| 22 | 199.391 | 4.20 | 1.48749 | 70.2 | 23.93 |
| 23 | −28.129 | 1.00 | 1.84666 | 23.8 | 23.69 |
| 24 | −81.840 | 0.15 | | | 23.60 |
| 25 | 58.012 | 2.52 | 1.69680 | 55.5 | 24.09 |
| 26 | 1167.596 | (VARIABLE) | | | 25.00 |
| 27 | −169.221 | 1.10 | 1.83400 | 37.2 | 23.00 |
| 28 | 52.668 | 2.41 | | | 23.16 |
| 29 | 97.909 | 4.83 | 1.80518 | 25.4 | 24.05 |
| 30 | −40.123 | 4.41 | | | 24.37 |
| 31 | −32.997 | 1.10 | 1.80400 | 46.6 | 23.29 |
| 32 | 59.999 | (VARIABLE) | | | 23.24 |

-continued

| 33 | 40.936 | 3.66 | 1.48749 | 70.2 | 33.40 |
| 34 | 116.651 | | | | 33.52 |

VARIOUS DATA
ZOOM RATIO 4.02

| | WIDE-ANGLE | MIDDELE | TELEPHOTO |
|---|---|---|---|
| FOCAL LENGTH | 72.20 | 135.00 | 289.98 |
| F-NUMBER | 4.05 | 4.25 | 5.89 |
| FIELD ANGLE | 16.68 | 9.10 | 4.27 |
| IMAGE HEIGHT | 21.64 | 21.64 | 21.64 |
| ENTIRE LENS LENGTH | 178.09 | 208.11 | 232.06 |
| BF | 39.16 | 39.15 | 39.11 |
| d 5 | 11.03 | 41.03 | 65.03 |
| d10 | 26.31 | 15.63 | 1.28 |
| d16 | 4.67 | 21.45 | 44.06 |
| d19 | 16.24 | 10.14 | 1.88 |
| d26 | 13.70 | 10.88 | 1.00 |
| d32 | 2.12 | 4.97 | 14.84 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1 | 152.13 | 13.83 | −0.73 | −9.96 |
| 2 | 6 | −39.84 | 7.72 | 4.24 | −1.04 |
| 3 | 11 | 50.15 | 10.51 | 3.15 | −3.96 |
| 4 | 17 | −68.69 | 4.23 | 0.23 | −2.13 |
| 5 | 20 | 38.80 | 11.05 | 3.67 | −3.32 |
| 6 | 27 | −33.46 | 13.85 | 7.99 | −1.76 |
| 7 | 33 | 127.35 | 3.66 | −1.31 | −3.74 |

Numerical Example 5

Unit mm
SURFACE DATA

| SURFACE NO. | r | d | nd | vd | EFFECTIVE DIAMETER |
|---|---|---|---|---|---|
| 1 | 143.034 | 5.54 | 1.48749 | 70.2 | 54.00 |
| 2 | −199.532 | 0.15 | | | 53.73 |
| 3 | 110.703 | 6.41 | 1.43875 | 94.9 | 50.99 |
| 4 | −137.971 | 2.40 | 1.61340 | 44.3 | 50.40 |
| 5 | 300.064 | (VARIABLE) | | | 48.00 |
| 6 | 209.232 | 3.41 | 1.80518 | 25.4 | 25.82 |
| 7 | −47.670 | 1.20 | 1.71300 | 53.9 | 25.40 |
| 8 | 55.132 | 2.87 | | | 24.21 |
| 9 | −59.415 | 1.20 | 1.83481 | 42.7 | 24.16 |
| 10 | 169.476 | (VARIABLE) | | | 25.40 |
| 11 | 106.222 | 1.20 | 1.80518 | 25.4 | 25.40 |
| 12 | 40.480 | 4.25 | 1.60311 | 60.6 | 25.47 |
| 13 | −85.936 | 0.15 | | | 25.58 |
| 14 | 48.559 | 3.23 | 1.49700 | 81.5 | 25.56 |
| 15 | −391.738 | 1.00 | | | 25.43 |
| 16(STOP) | ∞ | (VARIABLE) | | | 25.00 |
| 17 | −39.939 | 1.20 | 1.57135 | 53.0 | 22.40 |
| 18 | 44.627 | 2.34 | 1.84666 | 23.8 | 22.40 |
| 19 | 150.152 | (VARIABLE) | | | 22.40 |
| 20 | −88.602 | 2.70 | 1.74950 | 35.3 | 24.20 |
| 21 | −35.619 | 0.15 | | | 24.65 |
| 22 | 94.899 | 4.87 | 1.48749 | 70.2 | 24.71 |
| 23 | −29.629 | 1.00 | 1.84666 | 23.8 | 24.62 |
| 24 | −108.948 | 0.15 | | | 25.00 |
| 25 | 54.287 | 3.31 | 1.51633 | 64.1 | 25.19 |
| 26 | −164.837 | (VARIABLE) | | | 25.00 |
| 27 | −124.411 | 1.10 | 1.83400 | 37.2 | 25.00 |
| 28 | 45.989 | 4.06 | | | 24.16 |
| 29 | 81.582 | 5.41 | 1.80518 | 25.4 | 25.90 |
| 30 | −39.047 | 5.16 | | | 26.16 |

-continued

| 31 | −32.853 | 1.10 | 1.83481 | 42.7 | 24.52 |
| 32 | 73.930 | (VARIABLE) | | | 24.65 |
| 33 | 41.927 | 3.56 | 1.48749 | 70.2 | 33.40 |
| 34 | 116.703 | | | | 33.52 |

VARIOUS DATA
ZOOM RATIO 4.02

| | WIDE-ANGLE | MIDDELE | TELEPHOTO |
|---|---|---|---|
| FOCAL LENGTH | 72.19 | 135.00 | 289.96 |
| F-NUMBER | 4.11 | 4.48 | 5.93 |
| FIELD ANGLE | 16.68 | 9.10 | 4.27 |
| IMAGE HEIGHT | 21.64 | 21.64 | 21.64 |
| ENTIRE LENS LENGTH | 178.05 | 207.71 | 232.19 |
| BF | 39.24 | 39.24 | 39.24 |
| d 5 | 6.94 | 36.49 | 60.94 |
| d10 | 25.69 | 14.61 | 1.28 |
| d16 | 3.62 | 20.90 | 44.60 |
| d19 | 18.18 | 11.99 | 1.62 |
| d26 | 11.59 | 9.55 | 1.00 |
| d32 | 3.67 | 5.83 | 14.40 |

LENS UNIT DATA

| UNIT | FIRST SURFACE | FOCAL LENGTH | LENS UNIT LENGTH | FRONT PRINCIPAL POINT | REAR PRINCIPAL POINT |
|---|---|---|---|---|---|
| 1 | 1 | 150.73 | 14.50 | −0.87 | −10.49 |
| 2 | 6 | −38.12 | 8.68 | 5.28 | −0.86 |
| 3 | 11 | 47.98 | 9.83 | 3.00 | −3.68 |
| 4 | 17 | −72.32 | 3.54 | 0.49 | −1.53 |
| 5 | 20 | 38.92 | 12.18 | 3.91 | −4.03 |
| 6 | 27 | −32.52 | 16.82 | 8.03 | −3.52 |
| 7 | 33 | 132.17 | 3.56 | −1.32 | −3.68 |

TABLE 1

| | | CONDITION | | | | | | | | |
|---|---|---|---|---|---|---|---|---|---|---|
| | | (1) | (2) | (3) | (4) | (5) | (6) | (7) | (8) | (9) |
| NUMERICAL EXAMPLE | 1 | 2.534 | 6.254 | 3.451 | — | — | 1.61340 | 44.3 | −0.00599 | 0.825 |
| | 2 | 2.651 | 7.677 | 4.104 | — | — | 1.65412 | 39.7 | −0.00332 | 0.739 |
| | 3 | 2.109 | 5.240 | 3.178 | — | — | 1.65412 | 39.7 | −0.00332 | 0.824 |
| | 4 | 1.746. | 4.919 | 2.929 | — | — | 1.61340 | 44.3 | −0.00599 | 0.800 |
| | 5 | — | — | — | 0.734 | 2.050 | 1.61340 | 44.3 | −0.00599 | 0.801 |

Embodiment 6

Next, description will be made of a single lens reflex camera as an optical apparatus using the zoom lens described in any one of Embodiments 1-5.

Figure 16:
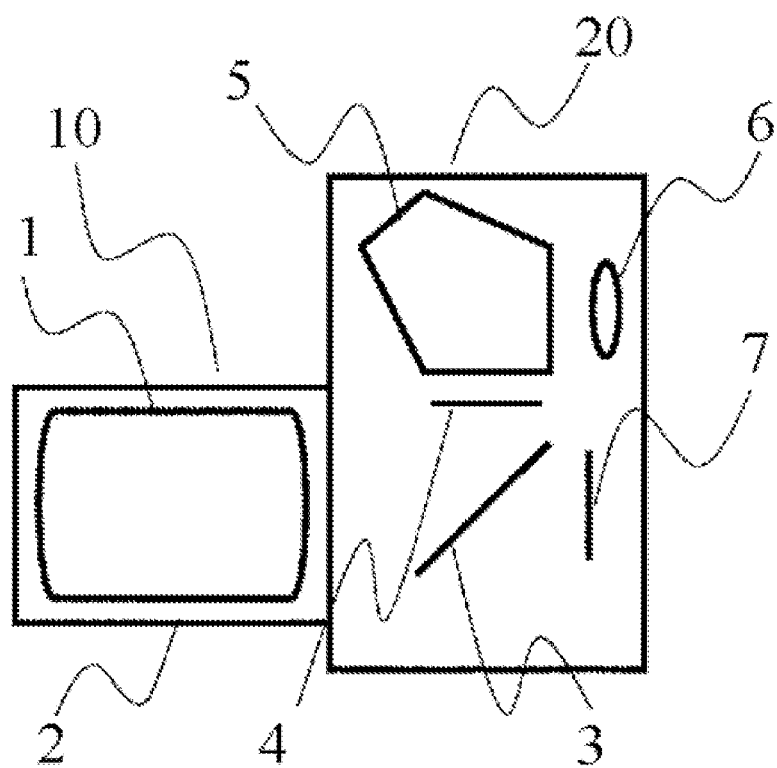
FIG. 16 shows a configuration of a camera in which the zoom lens of any one of Embodiments 1 to 5 is used.

FIG. 16 shows a configuration of the single lens reflex camera that is a sixth embodiment (Embodiment 6) of the present invention. Reference numeral 10 denotes an interchangeable lens that houses the zoom lens 1 that is any one of Embodiments 1-5.

The zoom lens 1 is held by a lens main barrel 2. Reference numeral 20 denotes a camera main body. The camera main body 20 is provided with a quick return mirror 3 that reflects a light flux from the interchangeable lens 10 upward, a focusing plate 4 placed at an image-forming position of the interchangeable lens 10, and a penta-dach prism 5 that converts an inverted image formed on the focusing plate into an erected image. Moreover, the camera main body 20 is provided with an ocular lens 6 to allow a user to observe the erected image. Reference numeral 7 denotes a light-sensitive surface at which an image pickup element (photoelectric conversion element) such as a CCD sensor or a CMOS sensor is placed. At a time of image capturing, the quick return mirror 3 is retracted outside an optical path, and thereby an object image is formed by the interchangeable lens 10 (that is, by the zoom lens 1) on the light-sensitive surface 7.

Although this embodiment described the case where the zoom lens 1 is housed in the interchangeable lens 10, the zoom lens of each of Embodiments 1-5 may be used for a lens integrated digital still camera or a lens-integrated video camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-081072, filed on Mar. 31, 2010, which is hereby incorporated by reference herein in its entirety.

What is claimed is:
1. A zoom lens comprising:
a first lens unit configured to be disposed closest to an object of all lens units within the zoom lens and having a positive optical power; and
at least one subsequent lens unit configured to be disposed closer to an image than the first lens unit,
wherein the first lens unit is configured to move toward the object during variation of magnification from a wide-angle end to a telephoto end, and
wherein the first lens unit comprises at least three lenses including a positive meniscus lens configured to be disposed closest to the image among the at least three lenses and having an image side concave surface, and a negative lens configured to be disposed on an object side next to the positive meniscus lens, and satisfies the following condition:

$$1.55 < Rpi/f1 < 2.90,$$

where Rpi represents a curvature radius of the image side concave surface of the positive meniscus lens, and f1 represents a focal length of the first lens unit,
wherein the negative lens in the first lens unit is a negative meniscus lens having an object side convex surface, and satisfies the following condition:

$$0.50 < Rpi/Rno < 6.00,$$

where Rno represents a curvature radius of the object side convex surface of the negative meniscus lens, and
wherein the zoom lens satisfies the following condition:

$$1.50 < Nn < 1.68,$$

where Nn represents a refractive index of a material forming the negative lens.

2. A zoom lens according to claim 1, wherein the zoom lens satisfies the following condition:

$$0.80 < Rpi/td1 < 9.00,$$

where td1 represents a movement amount of the first lens unit toward the object during the variation of magnification from the wide-angle end to the telephoto end.

3. A zoom lens according to claim 1, wherein the zoom lens satisfies the following conditions:

$$20 < vdN < 55; \text{ and}$$

$$-0.015 < \theta gF - 0.6438 + 0.001682 \times vdN < 0.002,$$

where vdN and θgF respectively represent an Abbe number of a material forming the negative lens for a d-line and an anomalous partial dispersion ratio of the material forming the negative lens for a g-line.

4. A zoom lens according to claim 1, wherein the zoom lens satisfies the following condition:

$$0.2 < tdt/ft < 1.0,$$

where tdt represents a distance from a most-object side surface of the first lens unit to a most-image side surface of the subsequent lens unit at the telephoto end, and ft represents a focal length of the zoom lens at the telephoto end.

5. A zoom lens according to claim 1, wherein:
the subsequent lens unit is disposed next to the first lens unit, and includes a second lens unit having a negative optical power, and
the second lens unit is unmoved during variation of magnification between the wide-angle end and the telephoto end.

6. An optical apparatus comprising:
a zoom lens; and
an image pickup element configured to pick up an image formed by the zoom lens;
wherein the zoom lens includes a first lens unit configured to be disposed closest to an object of all lens units within the zoom lens and has a positive optical power, and at least one subsequent lens unit configured to be disposed closer to an image than the first lens unit,
wherein the first lens unit is configured to move toward the object during variation of magnification from a wide-angle end to a telephoto end, and
wherein the first lens unit comprises at least three lenses including a positive meniscus lens configured to be disposed closest to the image among the at least three lenses and having an image side concave surface, and a negative lens configured to be disposed on an object side next to the positive meniscus lens, and satisfies the following condition:

$$1.55 < Rpi/f1 < 2.90,$$

where Rpi represents a curvature radius of the image side concave surface of the positive meniscus lens, and f1 represents a focal length of the first lens unit,
wherein the negative lens in the first lens unit is a negative meniscus lens having an object side convex surface, and satisfies the following condition:

$$0.50 < Rpi/Rno < 6.00,$$

where Rno represents a curvature radius of the object side convex surface of the negative meniscus lens, and
wherein the zoom lens satisfies the following condition:

$$1.50 < Nn < 1.68,$$

where Nn represents a refractive index of a material forming the negative lens.

* * * * *